United States Patent
Seed et al.

(10) Patent No.: US 11,677,858 B2
(45) Date of Patent: Jun. 13, 2023

(54) OPTIMIZING INTERACTION BETWEEN APPLICATIONS AND DEVICES IN A COMMUNICATIONS NETWORK

(71) Applicant: CONVIDA WIRELESS, LLC, Wilmington, DE (US)

(72) Inventors: Dale N. Seed, Allentown, PA (US); Catalina Mihaela Mladin, Hatboro, PA (US); William Robert Flynn, IV, Schwenksville, PA (US); Zhuo Chen, Claymont, DE (US); Quang Ly, North Wales, PA (US); Jiwan L. Ninglekhu, Conshohocken, PA (US); Lu Liu, Conshohocken, PA (US); Rocco Di Girolamo, Laval (CA)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 17/420,194

(22) PCT Filed: Dec. 9, 2019

(86) PCT No.: PCT/US2019/065207
§ 371 (c)(1),
(2) Date: Jul. 1, 2021

(87) PCT Pub. No.: WO2020/142164
PCT Pub. Date: Jul. 9, 2020

(65) Prior Publication Data
US 2022/0150324 A1    May 12, 2022

Related U.S. Application Data

(60) Provisional application No. 62/788,270, filed on Jan. 4, 2019.

(51) Int. Cl.
*H04L 67/60* (2022.01)
*H04L 67/12* (2022.01)

(52) U.S. Cl.
CPC .............. *H04L 67/60* (2022.05); *H04L 67/12* (2013.01)

(58) Field of Classification Search
CPC ................................. H04L 67/32; H04L 67/12
See application file for complete search history.

(56) References Cited

U.S. PATENT DOCUMENTS

2010/0125671 A1\* 5/2010 Thubert ................. H04W 4/38
709/230
2017/0006135 A1\* 1/2017 Siebel ..................... H04L 67/12
2018/0113498 A1 4/2018 Cronin et al.

FOREIGN PATENT DOCUMENTS

WO    2017/152070 A1    9/2017

OTHER PUBLICATIONS

"Functional Architecture," oneM2M TS-0001 oneM2M, V-3.10.0, Feb. 2018.

(Continued)

*Primary Examiner* — Normin Abedin
(74) *Attorney, Agent, or Firm* — BakerHostetler

(57) ABSTRACT

An apparatus can monitor interactions between IoT devices and IoT applications. Based on the monitoring, the apparatus may identify an interaction between a given IoT device and a given IoT application that can be adjusted. In an example, the apparatus may generate a recommendation or instruction in response to identifying the interaction. A first instruction may indicate a change in behavior for one of the IoT device or the IoT application. The apparatus may send the instruction to the one of the IoT device or the IoT application, for example, so as to cause the one of the IoT device or the IoT application to change the respective behavior, thereby (Continued)

adjusting the interaction between the IoT device and the IoT application.

17 Claims, 22 Drawing Sheets

(56) References Cited

OTHER PUBLICATIONS

"Lightweight Machine to Machine Technical Specification," (LWM2MSpecification), Open Mobile Alliance (OMA), Approved Version 1.0, Feb. 8, 2017, pp. 1-138.
"OIC Core Specifications," Open Connectivity Foundation (OFC), V1.1.0, 2016, pp. 1-151.
ETSI TS 102 690 "Machine-to-Machine Communications (M2M)," Functional Architecture V2.0.13, May 15, 2013, pp. 1-328.

* cited by examiner

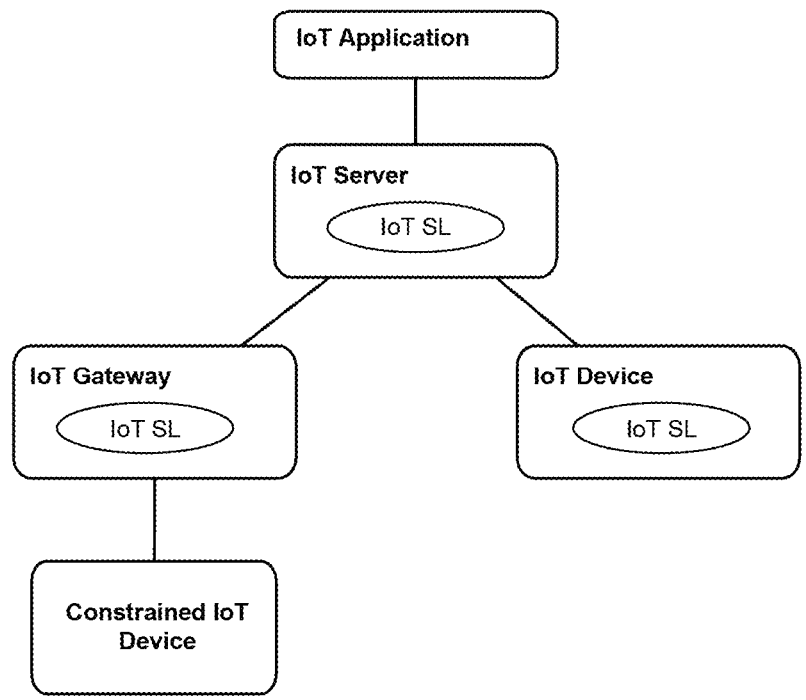

1900

Recommendation Policy

Enable: TRUE
Policy Type: Rate Control
Targets: resource1
Entities: App1, Device 1
Max Publishing Rate: 10 reading/hr
Min Publishing Rate: 1 reading/hr
Trigger Criteria: Rate mismatch
Recommendation: Adjust Rate

Issued Recommendations

Tues 5/13 9:25am Recommendation sent to App1 to decrease rate : 2 samples/hr

Thurs 5/15 11:53am Recommendation sent to Device1 to increase rate : 2 samples/hr

FIG. 19

OPTIMIZING INTERACTION BETWEEN APPLICATIONS AND DEVICES IN A COMMUNICATIONS NETWORK

CROSS-REFERENCE TO RELATED APPLICATIONS

This application is the National Stage Application of International Patent Application No. PCT/US2019/065207, filed Dec. 9, 2019, which claims the benefit of U.S. Provisional Patent Application No. 62/788,270, filed Jan. 4, 2019, which is hereby incorporated by reference in its entirety.

BACKGROUND

An Internet-of-Things (IoT) Service Layer (SL) is a technology specifically targeted toward providing value-added services for IoT devices, IoT applications, and IoT data. IoT SLs can address challenges associated with the integration of IoT devices, applications, and data into deployments with the Internet/Web, cellular, enterprise, and home networks.

An IoT SL can provide applications and devices access to a collection of IoT oriented capabilities. Example capabilities include security, charging, data management, device management, discovery, provisioning, and connectivity management. These capabilities and others can be made available to devices and applications via application programming interfaces (APIs) that make use of message formats, resource structures, and resource representations supported by the IoT SL.

Referring to FIG. 1, from a protocol stack perspective, a SL 202 can be situated above the Application Protocol Layer 204 so as to provide value added services to applications 206 they support. Thus, SLs are often categorized as 'middleware' services. FIG. 1 shows an exemplary service layer between the Application Protocols and Applications. The IoT SL 202 can be deployed on various types of network nodes including IoT servers 206, gateways 208, and devices 210 as shown in FIG. 2.

The oneM2M standard defines a Service Layer called a Common Service Entity (CSE). A purpose of the Service Layer is to provide "horizontal" services that can be utilized by different "vertical" M2M systems and applications. The CSE can support four reference points as shown in FIG. 3. The Mca reference point interfaces with the Application Entity (AE). The Mcc reference point interfaces with another CSE within the same service provider domain, and the Mcc' reference point interfaces with another CSE in a different service provider domain. The Mcn reference point interfaces with the underlying network service entity (NSE). An NSE provides underlying network services to the CSEs, such as device management, location services, and device triggering. A CSE contains multiple logical functions called Common Service Functions (CSFs). Example CSFs include Discovery and Data Management & Repository.

The oneM2M architecture enables various nodes, such as an Application Service Node (ASN), an Application Dedicated Node (ADN), a Middle Node (MN), an Infrastructure Node (IN), or a Non-oneM2M Node (NoDN). A given ASN may contain one CSE and at least one Application Entity (AE). In an example physical mapping, an ASN resides in an M2M Device. A given ADN may contain at least one AE and does not contain a CSE. In example, there may be zero or more ADNs in the Field Domain of a oneM2M System. In an example, the ADN resides in a constrained M2M device. A given MN may contain one CSE and zero or more AEs. There may be zero or more MNs in the Field Domain of the oneM2M System. As an example, a MN may reside in an M2M Gateway. A given IN may contain one CSE and zero or more AEs. In some cases, there is exactly one IN in the Infrastructure Domain per oneM2M Service Provider. A CSE in an IN may contain CSE functions not applicable to other node types. As an example, a IN may reside in an M2M Service Infrastructure. A given NoDN might not contain oneM2M Entities (e.g., AEs or CSEs). Such Nodes can represent devices attached to the oneM2M system for interworking purposes, including management for example.

The oneM2M standard defines a <node> resource that represents an entity that hosts a oneM2M CSE or AE. A node can represent a physical entity (e.g., a device) or a logical entity (e.g., a virtual machine). The OneM2M standard defines a <schedule> resource that can be a child resource of a <node> resource. This <schedule> resource can indicate the time periods within which the node has underlying network connectivity, and during which the oneM2M CSE or AE hosted on the node is reachable for communication.

The oneM2M standard defines a [dataCollection] resource. This resource may be created and configured by an AE. The reportingSchedule attribute of this resource can be configured with times when a device can publish measured data to a CSE. This resource can be accessed by the device itself or used by an underlying device management server to configure a device with this information. The oneM2M standard [1] defines an activityPatternElements attribute for the <AE> and <remoteCSE> resources. This attribute can be configured with the anticipated communication schedules of an AE or CSE. This attribute is configured by the AE or CSE when registering to a Registrar CSE. A Registrar CSE can, in turn, share the information configured in this attribute with underlying networks such that the underlying network can try and reserve underlying network resources during these times.

It is recognized herein that current IoT systems include inefficient interactions between IoT devices and apps. It is further recognized herein that those inefficient interactions can limit the capabilities of the IoT and can deplete various resources of the IoT (e.g., battery life, processing, storage, messaging overhead, etc.).

SUMMARY

In accordance with an example aspect of the present disclosure, an apparatus comprises a processor, a memory, and communication circuitry. The apparatus may be an IoT gateway or server that includes a service layer, and the apparatus may be connected to a network via its communication circuitry. The apparatus can monitor interactions between IoT devices and IoT applications. Based on the monitoring, the apparatus may identify an interaction between a given IoT device and a given IoT application that can be adjusted. In an example, the apparatus may generate a recommendation or instruction in response to identifying the interaction. The first instruction may indicate a change in behavior for one of the IoT device or the IoT application. The apparatus may send the instruction to the one of the IoT device or the IoT application, for example, so as to cause the one of the IoT device or the IoT application to change the respective behavior, thereby adjusting the interaction between the IoT device and the IoT application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure

BRIEF DESCRIPTION OF THE DRAWINGS

A more detailed understanding may be had from the following description, given by way of example in conjunction with the accompanying drawings.

FIG. 1 depicts an example protocol stack that includes and supports a service layer.

FIG. 2 is a block diagram that shows an example of an Internet of Things (IoT) service layer deployed on various types of example nodes.

FIG. 19 depicts an example IRF user interface in accordance with an example embodiment.

DETAILED DESCRIPTION

With respect to the example oneM2M resources and attributes described above, it is recognized herein that current approaches lack functionality to enable a CSE to configure and manage the <schedule> resource. It is further recognized herein that current approaches lack functionality to enable a CSE to manage and configure the reportingSchedule attribute in an autonomous manner. It is further recognized herein that current approaches lack functionality to enable a CSE to configure and manage the activityPatternElements attribute in an autonomous manner.

In some cases, it is recognized herein, IoT deployments suffer from the technical problem of non-optimal interaction between IoT devices and IoT applications (apps). For example, IoT sensor devices may repeatedly publish sensor readings to an IoT cloud server, even during times when no IoT apps are interested in sampling these readings. As another example technical problem, publishing time windows and/or rates of sensors might not be aligned with the sampling time windows or rates of IoT apps. As yet another example of a technical problem, IoT actuator devices may be triggered and woken-up to service commands in an inefficient manner, for example, because the commands are issued by different IoT apps in an uncoordinated manner.

It is recognized herein that the inefficiencies and problems described above, among others, can be due to inadequate coordination between IoT devices and IoT apps. For example, IoT devices might not be aware of the requirements and characteristics of the IoT apps that consume their sensor readings or send them commands. Likewise, IoT apps typically do not coordinate with other IoT apps to optimize their interaction with shared IoT devices with which they communicate. In addition, IoT apps might have little or no control over IoT device behavior, such as, for example, sensor publishing rates, actuator response times, or the information that is included or excluded in sensor readings, etc. This on-optimal interaction can result in various resources in the system not being optimally utilized. For example, resources that may be used inefficiently include, without limitation, the battery life of IoT devices, the bandwidth of IoT underlying networks, and the computing and storage resources of IoT Service Layers. The inefficiency may also lead to IoT apps not meeting their application use case and/or QoS requirements.

Figure 4:
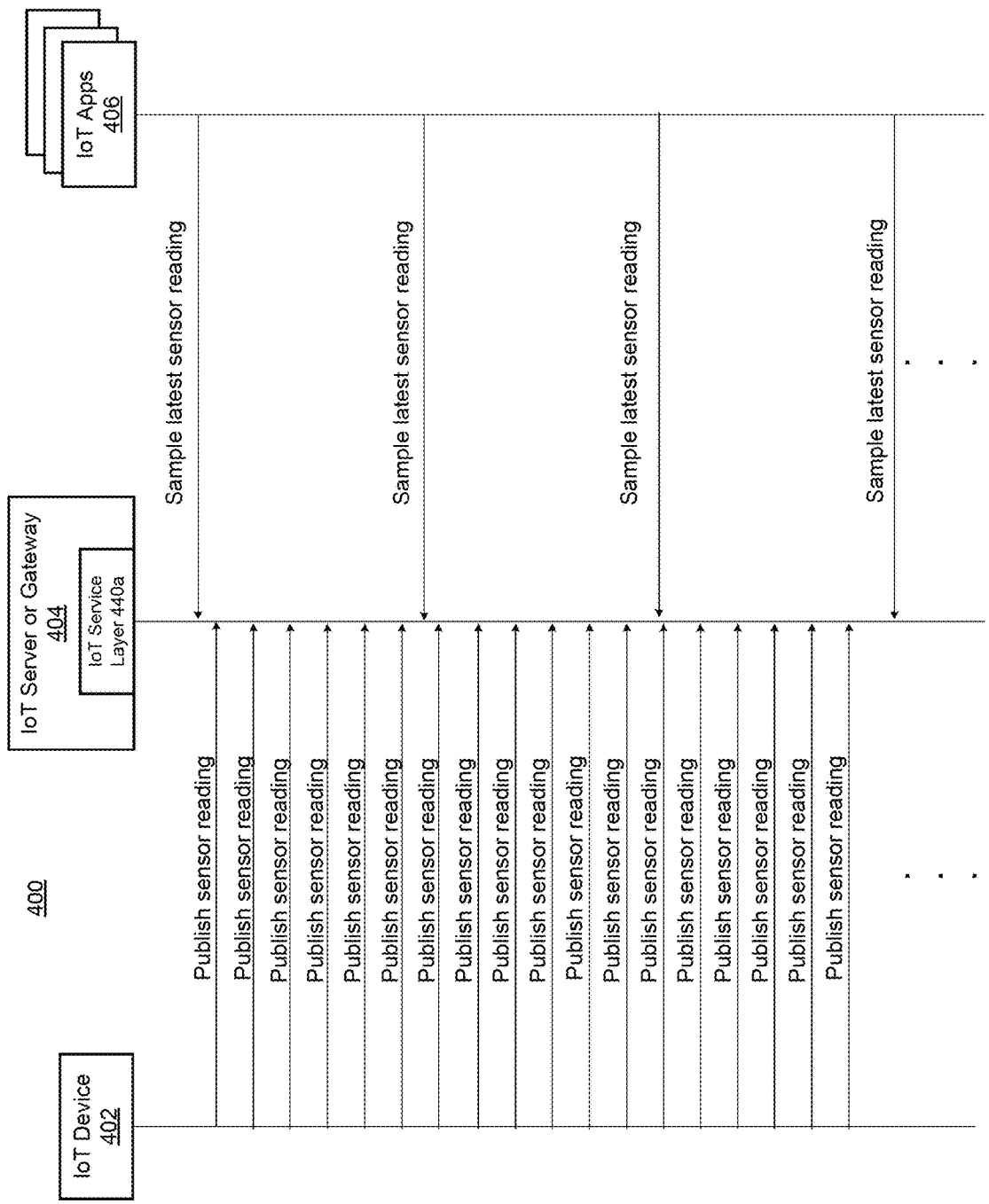
FIG. 4 is a call flow that shows an example use case in which sensor readings being published and sampled at a mismatched rate.

Referring now to FIG. 4, an example use case is depicted to illustrate an example inefficient interaction, specifically a mismatched rate of published and sampled sensor readings. An example IoT system 400 is shown that includes an IoT sensor device 402 and one or more IoT apps 406 that are sampling the sensor readings published by the device 402. The IoT system 400 further includes an IoT server or Gateway 404 having an IoT Service Layer 404a. The IoT sensor device 402 (at 408) publishes sensor readings to the IoT SL 404a hosted on the IoT Server or Gateway 404, where the sensor readings are stored. In turn (at 410), one or more IoT apps 406 issue requests to the IoT SL 404a to sample the latest sensor reading published by the IoT device 402. In this example, the rate that the IoT device 402 publishes sensor readings to the IoT SL is much greater than the rate in which the latest sensor reading is sampled by the collective set of IoT apps 406. As a result, in some cases, some of the published sensor readings from the IoT device are never sampled. The publishing of sensor readings that never end up being sampled by IoT apps can result in wasted and inefficient use of IoT devices, IoT networks, and IoT SL resources. This can be particularly detrimental, for example, to sensors that are intended to last for a long time using battery power.

Referring to FIG. 4, it will be understood that the reverse scenario is also possible in which the IoT apps 406 sample sensor readings from the IoT SL 404a at a faster rate than the IoT device 402 publishes sensor readings. This scenario can result in the IoT apps 406 over sampling the latest sensor reading, which can result in redundancy (repeated results) and wasted and inefficient use of the IoT networks, IoT SLs, and IoT app resources.

Figure 5:
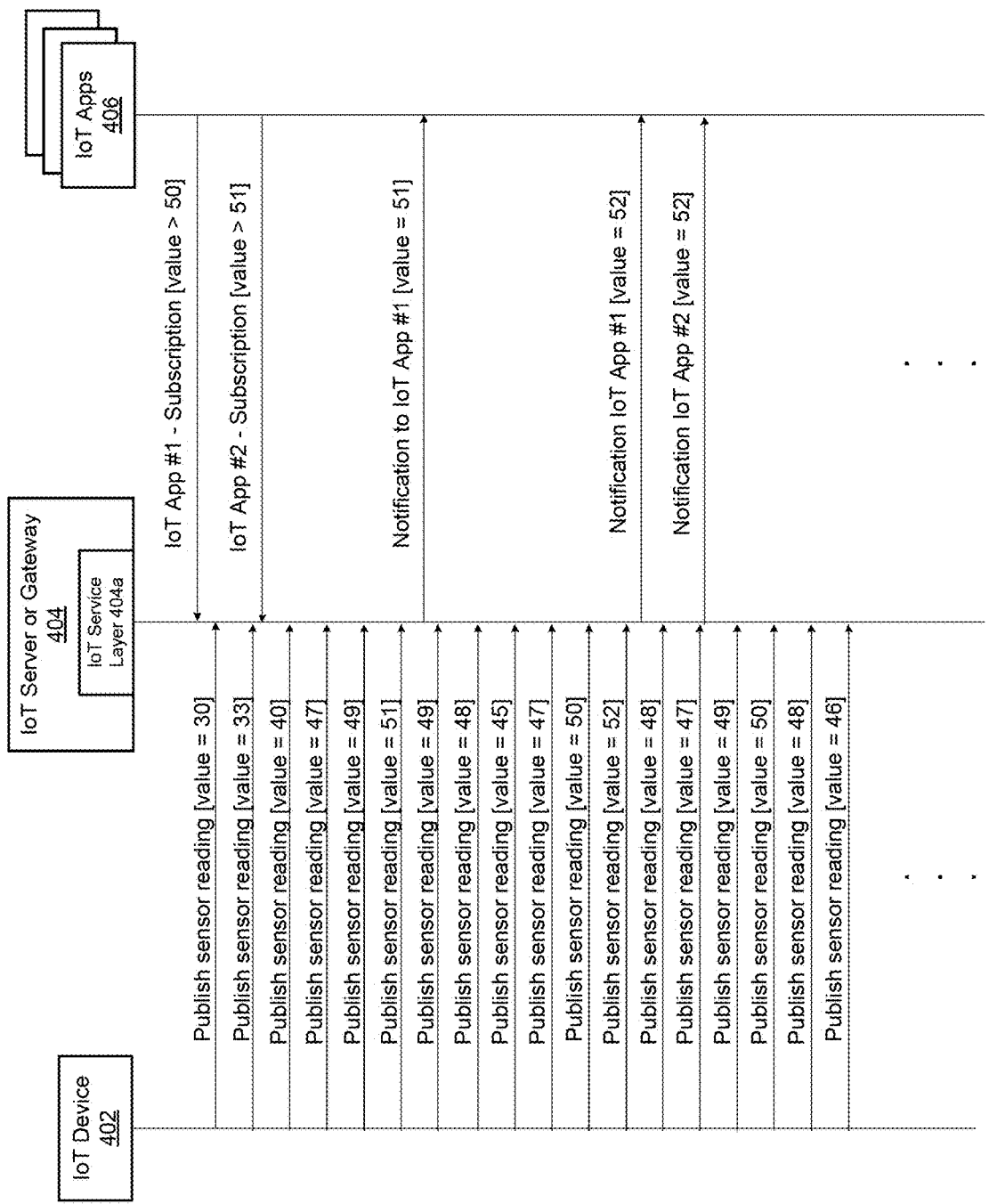
FIG. 5 is a call flow that shows an example use case in which sensor readings are not of interest.

Referring now to FIG. 5, another use case is depicted to illustrate another example inefficiency in current IoT systems. In accordance with the illustrated example, the IoT sensor device 402 publishes sensor readings to the IoT SL 404a hosted on the IoT Server or Gateway 406, where the sensor readings are stored. In the example, one or more IoT apps 406 have subscribed to the IoT SL 406a to receive notifications if/when published sensor readings from the IoT device 402 meet their respective specified criteria. In this example, the IoT device 402 blindly publishes sensor readings to the IoT SL 404a. Further, the IoT device 402 is unaware of the notification criteria specified by the IoT apps 406, and thus unaware of which sensor readings are of interest to the IoT apps 406 and which are of no interest. As a result, some of the published sensor readings from the IoT device do not result in notifications being sent to the IoT apps 406, and thus are never sampled. It is recognized herein that the publishing of sensor readings that are not sampled by IoT apps can translate into wasted and inefficient use of IoT devices, IoT networks and IoT SL resources.

Figure 6:
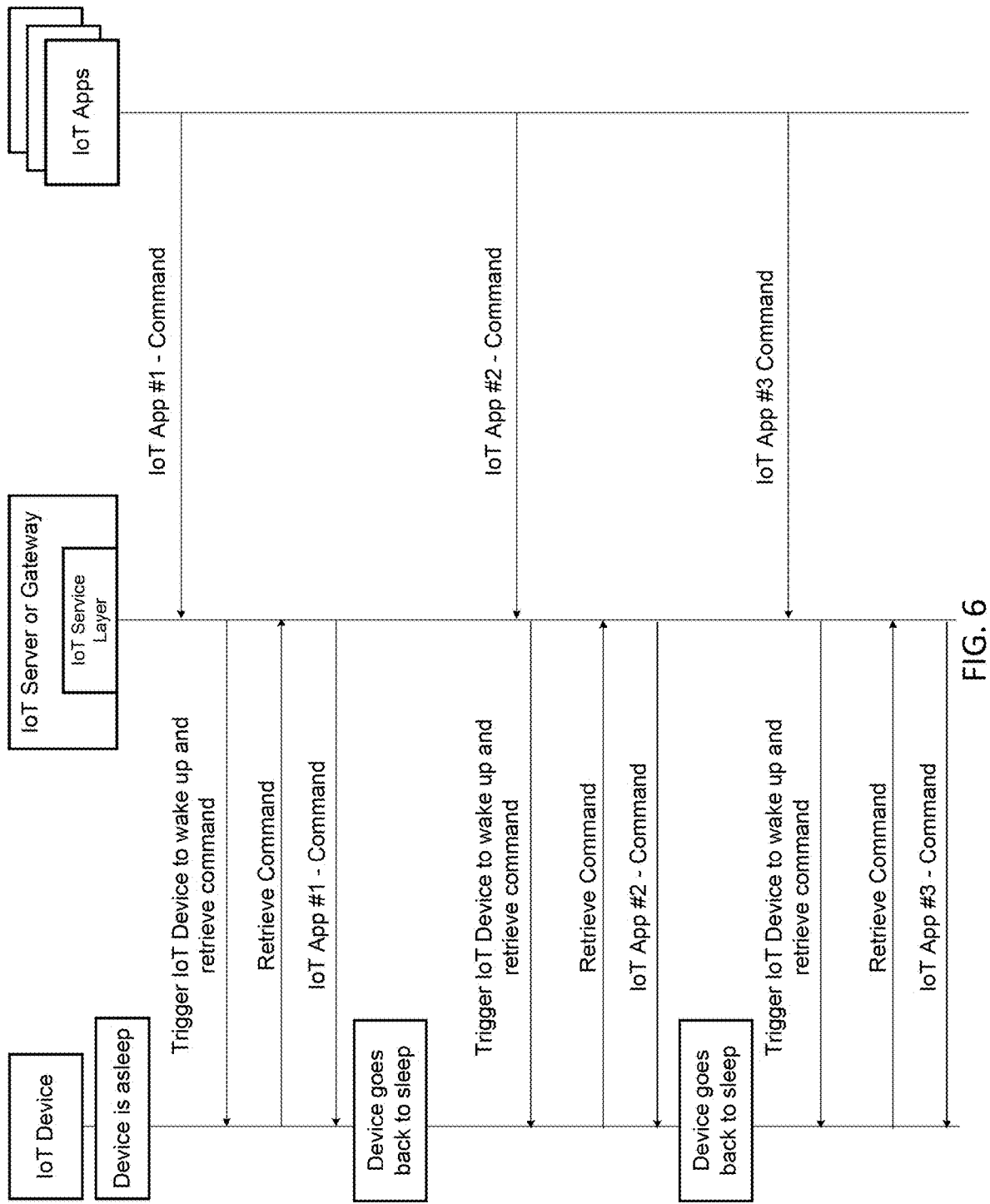
FIG. 6 is a call flow that shows an example use case in which multiple IoT applications (apps) use the same IoT device in an uncoordinated manner.

Referring now to FIG. 6, an example use case illustrates the inefficiency of uncoordinated use of the same IoT device by multiple apps, and how uncoordinated scheduling and issuing of commands by multiple IoT apps can introduce a burden and overhead on an IoT device. As IoT deployments are scaled, the likelihood may increase that more than one IoT app will be interested in interacting with the same IoT device. By way of example, multiple Apps may send commands to the same actuator device. For example, multiple family members might remotely controlling the same device in their home (e.g., thermostat, sprinkler system, etc.) via their apps. It is recognized herein that this example use case further compounds the challenge of optimizing the interaction between IoT devices and IoT apps because, for example, each IoT app interacting with an IoT device can have its own use case requirements that can differ from other IoT apps. For example, IoT app can have their own interaction schedules. Likewise, it is recognized herein that IoT apps typically do not coordinate amongst themselves to optimize their interactions (e.g., to align their schedules) with IoT devices for cases where they are accessing the same IoT device. For example, one IoT app may send a command every hour on the hour to a given device while a second IoT app may send a command every hour on the half hour to the same device. Not aligning the interaction of IoT apps accessing the same IoT device can cause inefficiencies. For example, the frequency a device needs to wake up from a sleep mode and enable its network connection to receive commands from IoT apps can be inefficient. If an IoT device can wake up less frequently and receive multiple commands during the same wake up cycle, this can allow the IoT device to sleep longer and extend its battery life.

Figure 7:
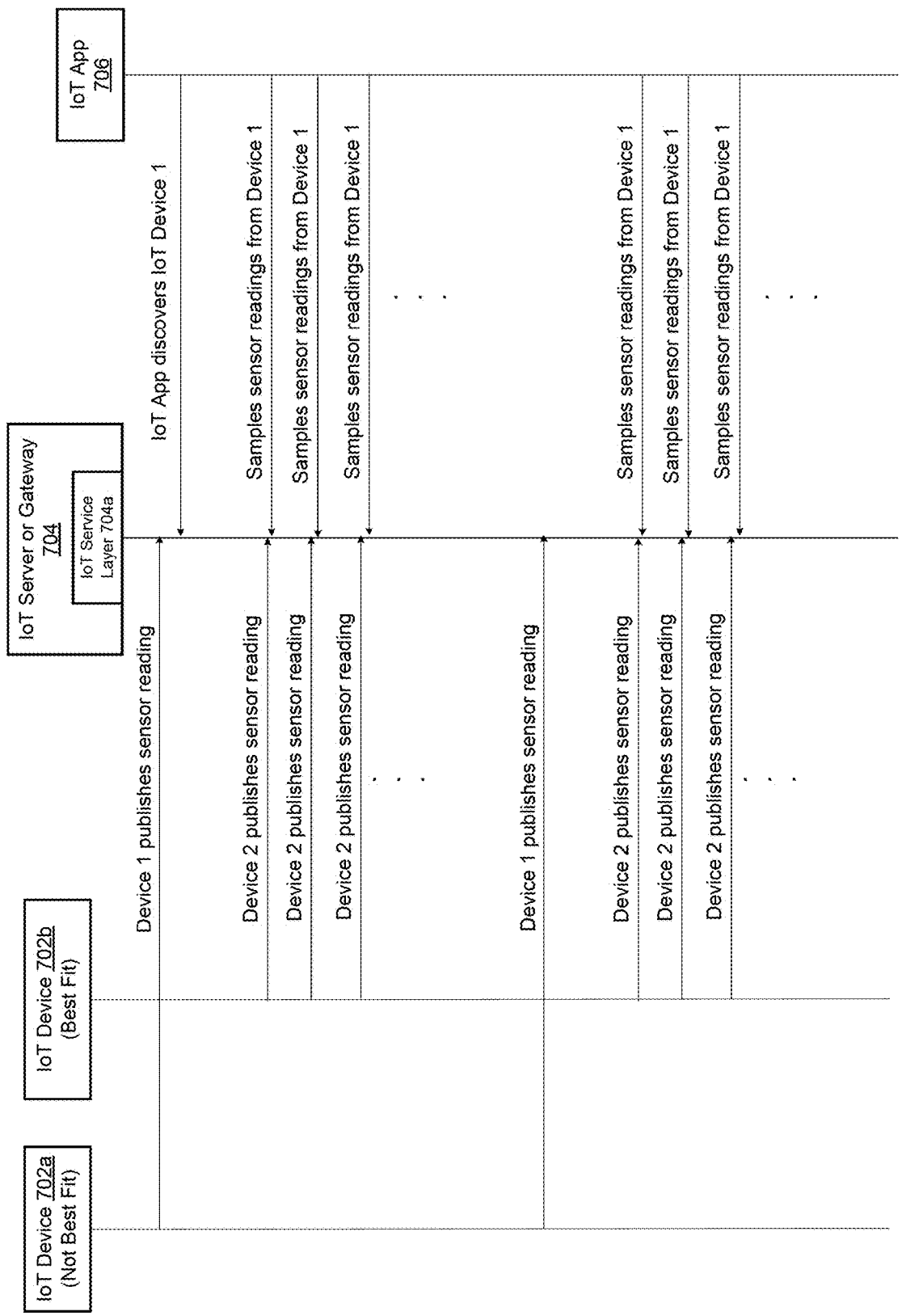
FIG. 7 is a call flow that shows an example use case that shows interactions with IoT devices that are not the best fit for a given IoT app.

Referring now to FIG. 7, an example use case is shown in which an IoT 706 app discovers and starts to interact with a first IoT device 702a. Unbeknown to the IoT app 706, there is a second IoT device 702b that available and suited for the IoT app 706 to interact with. By way of examples, a better suited IoT device 702b may publish sensor readings during a time window in which the IoT app 706 is interested in sampling the sensor readings, or the publishing rate of the sensor readings may align better with the sampling rate that is of interest to the IoT app 706, or the information published by the IoT device 702b in its sensor readings may align better with the type of information that the IoT app 706 is interested in sampling (e.g., the format or units of the data may be more compatible with the IoT app 706), or the IoT device 702b may reside in a location that is in closer proximity to the IoT app 796, or may be better suited to service requests from the IoT app 706 based on its current state (e.g., IoT device 702b may have a fully charged battery compared to IoT device 7021 that has a low battery level). It is recognized herein that matching up IoT devices with IoT apps that are best suited for one another can help optimize resources throughout the system. It can also help provide IoT apps with better quality of service and user experience.

Figure 8:
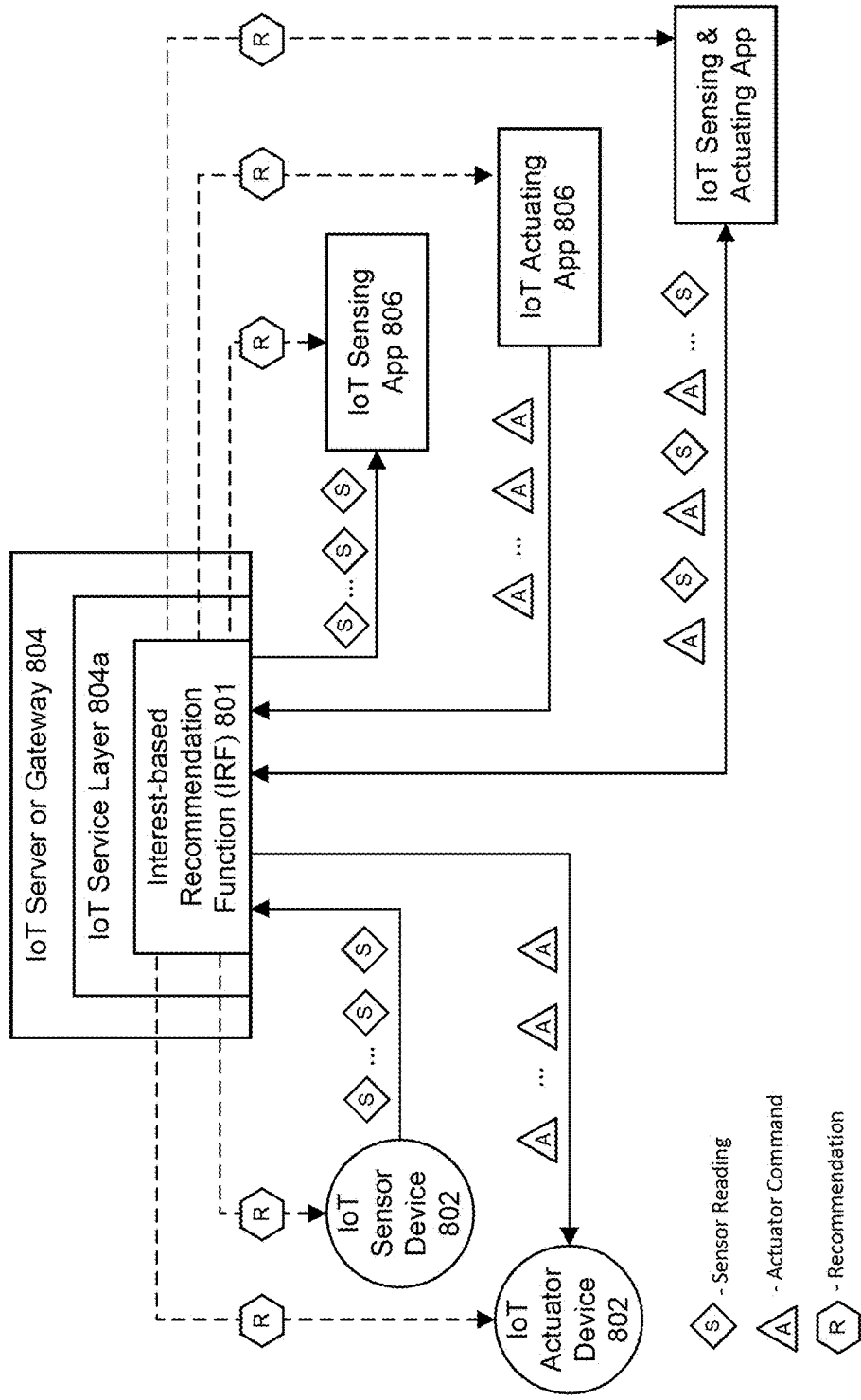
FIG. 8 is a system diagram that shows an example an Interest-based Recommendation Function (IRF) in accordance with an example embodiment.

Referring to FIG. 8, an example IoT system 800 is shown that includes an Interest-based Recommendation Function (IRF) 801 of an IoT SL 804a. The IRF 801 can monitor interaction patterns (e.g., SL request/response message exchanges indicated by the solid lines in FIG. 8) and trends to assess the interest that various IoT devices 802 and apps 806 have in communicating with one another at different times, and the interest they have in the different informational elements produced and consumed by one another. Based on the assessed interest, the IRF 801 can make on-the-fly recommendations to IoT devices 802 and IoT apps 806 (e.g., indicated by the dashed lines in FIG. 8) to adjust their schedule/rate of interaction, and/or to adjust the types of information they exchange with one another. As described further herein, the IRF 801 can issue recommendations that cause devices and/or applications to take specific actions. The recommendations can be instructions that control the devices or apps that receive the recommendations. Thus, the IRF 801 can issue recommendations that can include instructions that cause devices and/or applications to take specific actions indicated in the recommendations. Therefore, unless otherwise specified, recommendations can refer to instructions herein, and the terms recommendations and instruction can be used interchangeably, without limitation.

These recommendations and adjustments can help optimize and balance resource utilization across an entire IoT system in an end-to-end manner. For example, the IRF 801 can ensure that a sensor device 802 is not publishing sensor readings to the IoT Service Layer 804a at a faster rate than the aggregate rate of the IoT apps 806 sampling the sensor readings from the IoT Service Layer 804a. In doing so, resources such as IoT device resources (e.g., battery), network resources (e.g., bandwidth and spectrum), and IoT SL resources (e.g., processing and storage) can be optimized. The IRF 801 can also consider the use case requirements (e.g., QoS levels) of IoT apps 806 to ensure these requirements continue to be met along with the end-to-end optimization of the system's resources. For example, via the recommendations it makes to the IoT devices 802 and apps 806, the IRF 801 can ensure the publishing rate of a sensor is not reduced to a point where an IoT app is not able to obtain up-to-date samples in a timely enough manner to satisfy its application use case requirements.

In various examples, the service layer supports the IRF 801 that can optimize the exchange of IoT application layer information (e.g., sensor readings and actuator commands) between IoT devices and IoT apps. The IRF 801 can assess the interest of IoT apps in IoT devices, and visa-versa, by monitoring the requests that they issue to the IoT SL to publish and consume information produced by one another. For example, the IRF 801 can assess interest by computing the aggregate rate of requests issued from multiple IoT apps that are sampling sensor readings or sending actuator commands to the same IoT device. Comparing this aggregate rate of requests from the IoT apps against the rate that the IoT device is publishing sensor readings or consuming actuator commands, the IRF 801 can determine their respective interest in one another. Based on this interest, the IRF 801 can then detect inefficiencies and imbalances in their interactions. For example, there may be mismatches in the scheduled times or the rates at which the IoT devices or apps publish and consume each other's sensor readings or actuator commands to/from the IoT SL. Upon detecting these inefficiencies, the IRF 801 can recommend to the IoT devices and/or apps that they adjust and align their interest and interaction with one another. For example, the IRF 801 can recommend to the IoT apps to change their scheduled windows of time or the rate of requests during a scheduled time window such that their sampling of sensor readings from the IoT SL is aligned with the times and rates in which the IoT device is publishing the sensor reading of interest to the IoT SL. In doing so, the IRF 801 can optimize the resource utilization of the IoT device, the IoT network that interconnects the IoT device, the IoT SL, and the IoT apps. If/when new IoT apps or devices join/leave the system and/or change their rate or schedule of interaction, the IRF 801 can dynamically make adjustments by issuing on-the-fly recommendations to IoT apps and devices to enable them to re-adjust the interaction with the IoT SL accordingly.

Figure 9:
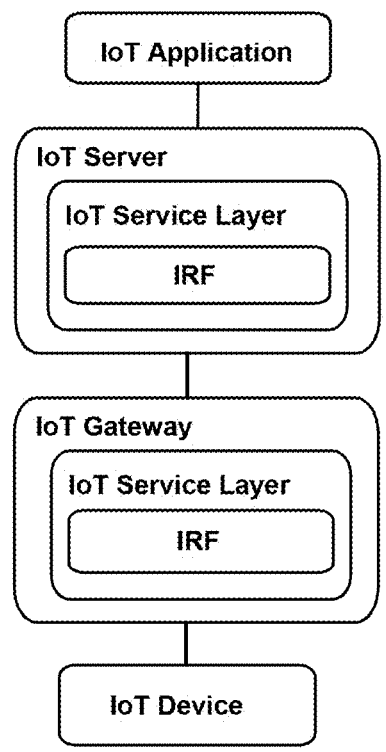
FIG. 9 is an example block diagram that shows the IRF deployed as IoT service layer (SL) function.

Referring to FIG. 9, the IRF 801 can be deployed as a function within an IoT SL 904a that is hosted on an IoT server or gateway 904. Alternatively, or additionally, the IRF 801 can be deployed as its own independent service.

Figure 10:
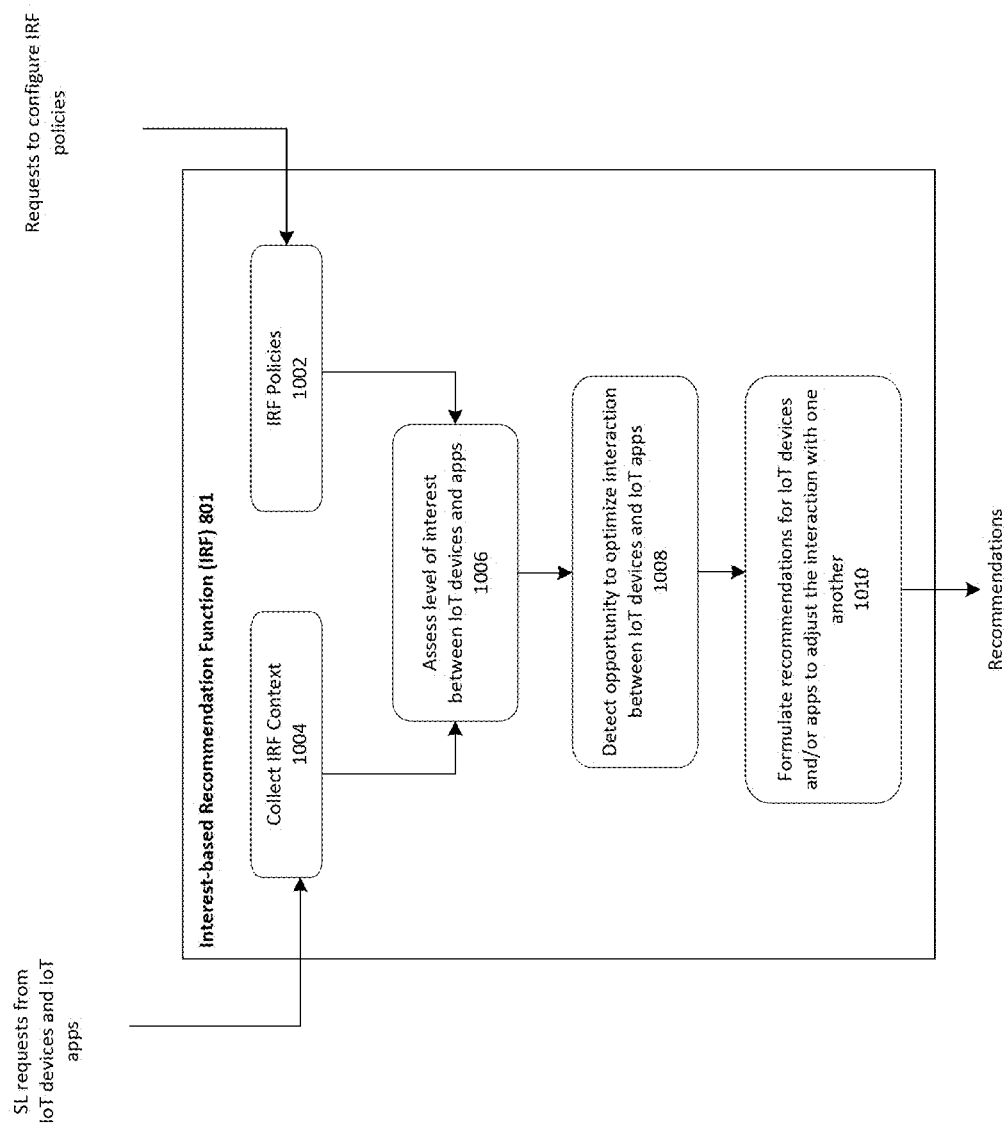
FIG. 10 is an example flow diagram for performing functions by the IRF.

Referring now to FIG. 10, the IRF 801 can be configured with IRF policies 1002 that define rules that the IRF can use as guidance for monitoring the requests issued by IoT devices and apps (at 1004), assessing the interest that IoT devices and apps have in interacting with one another at different times (at 1006), and making recommendations to IoT devices and apps to adjust and optimize their interaction with one another (at 1010). At 1004, the IRF 801 can dynamically collect SL context that is relevant to the interaction of IoT devices and IoT apps, and use this context to assess the interest, at 1006. Example context includes the rate and schedule that sensor readings and actuator commands are published to the IoT SL by IoT devices and apps, and the rate and schedule that these published sensor readings and actuators commands are sampled and consumed by other interested IoT devices and apps. Further, context can include the individual informational elements that are published by IoT devices and apps within their sensor readings and actuator commands and the type or value of these data elements that are sampled and consumed by other interested IoT devices and apps. At 1008, the IRF 801 can then analyze this context against IRF policies 1002 to detect opportunities to trigger the optimization of the interaction taking place between IoT devices and IoT apps. IRF policies 1002 can include IRF trigger criteria, which can be used by the IRF 801 to determine if/when opportunities for interaction optimization exist.

When an opportunity is detected, the IRF 801 can take action by sending recommendations to IoT devices and/or IoT apps to optimize their interaction with one another, which can result in a more efficient usage of system resources. For example, the IRF 801 can recommend to an IoT device or IoT app that it modify the rate or schedule that it publishes or samples sensor readings or actuator commands, to or from the IoT SL, such that the publishing and sampling rates are aligned with one another. Likewise, the IRF 801 can recommend to an IoT device or IoT app that it filter a subset of the data elements contained within its published sensor readings or actuator commands, for example, if there are no IoT devices or apps interested and sampling these data elements. The IRF 801 can make recommendations to IoT devices and apps by issuing recommendations to them. The IoT device or app can in turn act based off of the recommendation (e.g., change rate or schedule of publishing or sampling sensor readings). Depending on deployment requirements, the recommendations can be either mandatory or optional. Thus, the recommendations can be instructions that control the devices or apps that receive the recommendations.

Figure 11:
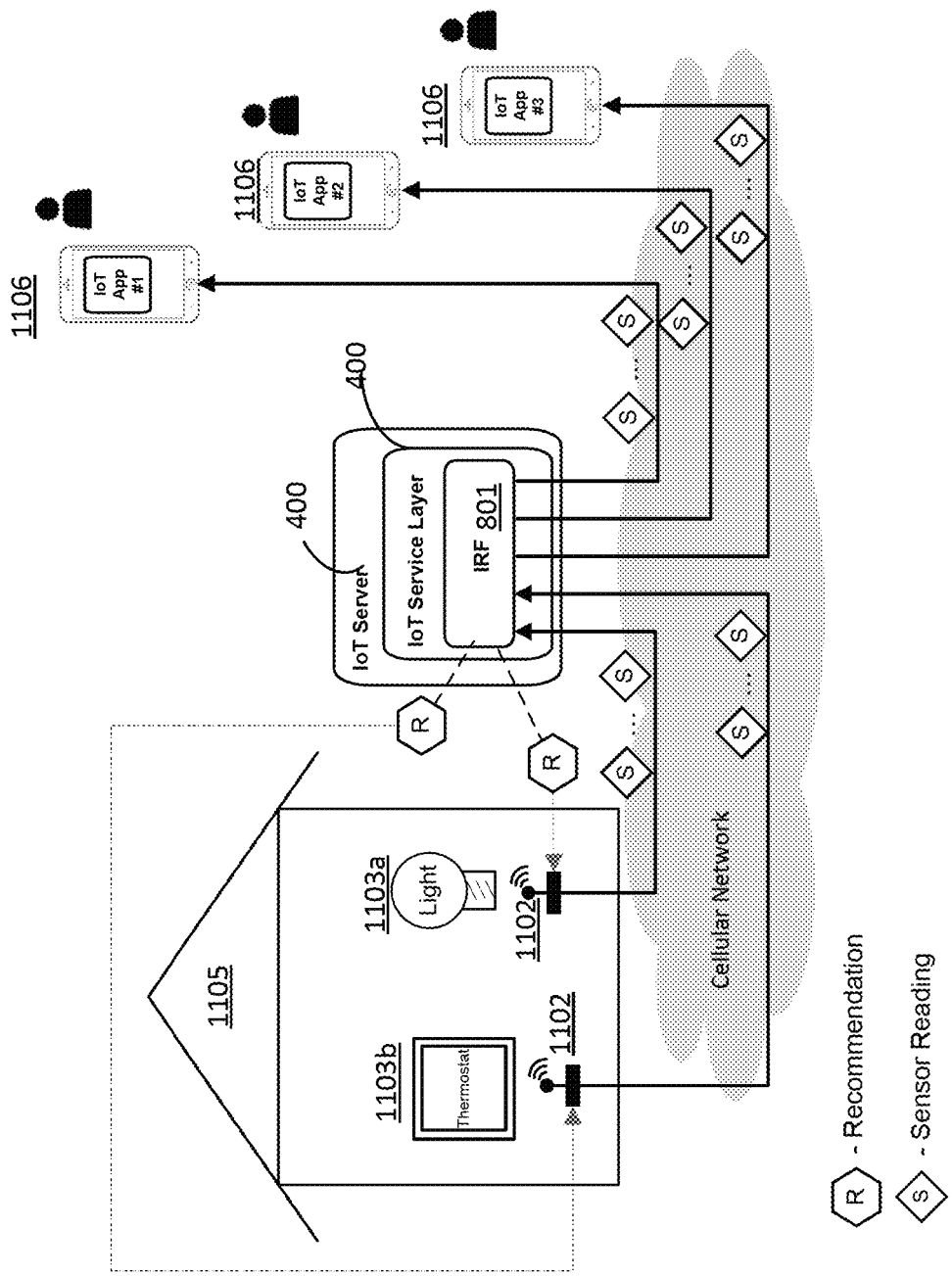
FIG. 11 depicts an example IRF use case in accordance with an example embodiment.

Referring now to FIG. 11, an example use case is shown to illustrate an example technical solution described herein. In the example, an IoT Service Provider has deployed its IoT server 1104 that hosts an IoT SL 1104a. The IoT SL 1104a is equipped with the IRF 801. The IRF 801 is configured with IRF policies to detect inefficiencies in the interaction between Narrow Band IoT (NB-IoT) cellular devices 1102 (e.g., sensors for lights, thermostats, etc.) and the IoT apps 1106 that interact with them. Continuing with the example, a customer of the IoT Service Provider is a family that has installed NB-IoT based sensors 1102 within their home 1105. The sensors 1102 are used to monitor various devices 1103 in the home, such as lights 1103a, appliances, and thermostats 1103b, which publish their state as sensor readings to the IoT SL 1104a (e.g., an alert if/when a light or appliance is left on). The sensor readings stored in the IoT SL 1104a are made accessible to each of the family members via a home app 1106 installed on each of the family member's smart phones.

Using the apps 1106, each family member can independently subscribe to the IoT SL 1104a to receive notifications if/when certain types of sensor readings are published. Each of these subscriptions can be customized by a given family member to include specific criteria, for example, so as to define what information that a given family member is interested in being notified about. For example, one family member may only be interested in notifications as to whether a particular light in a specified room or a particular appliance is left on for a certain duration of time. The IRF 801 can analyze the subscriptions from each of the family members. Based on analysis, the IRF 801 can determine the collective set of notification criteria across the entire family. Based on this determined information, and thus based on the analysis of the subscriptions, the IRF 801 can determine a subset of sensor readings for which the family is interested. Based on the subset information, the IRF 801 can recommend, or instruct, the sensor devices 1102 to only publish certain sensor readings to the IoT SL 1104a that meet the collective interest of the family. Other sensor readings can be filtered and not published to the IoT SL 1104a. As a result, in some cases, the sensors 1102 can drastically reduce the number of sensor readings they need publish to the IoT SL 1104a, which in turn can optimize and extend the lifetime of their batteries, among other technical benefits. For example, reducing the number of sensor readings can help optimize the resources of the underlying IoT cellular network and the IoT SL.

In another example, with general reference to FIG. 11, the IRF 801 of the IoT SL 1104a can also interact with the underlying cellular network before or after issuing a recommendation/instruction to an IoT device 1102 or IoT apps 1106. In doing so, the IRF 801 can align the recommendations it issues to IoT devices 1102 and apps 1106 with the configuration of the underlying cellular network that is used for underlying communication between the IoT devices 1102 and apps 1106. For example, the IRF 801 can issue requests to the underlying cellular network to configure the PSM and eDRX timers and network resources associated with a NB-IoT device, so that these settings are aligned with the time windows and rate of requests issued by one or more IoT apps that target requests toward the NB-IoT device.

Figure 12:
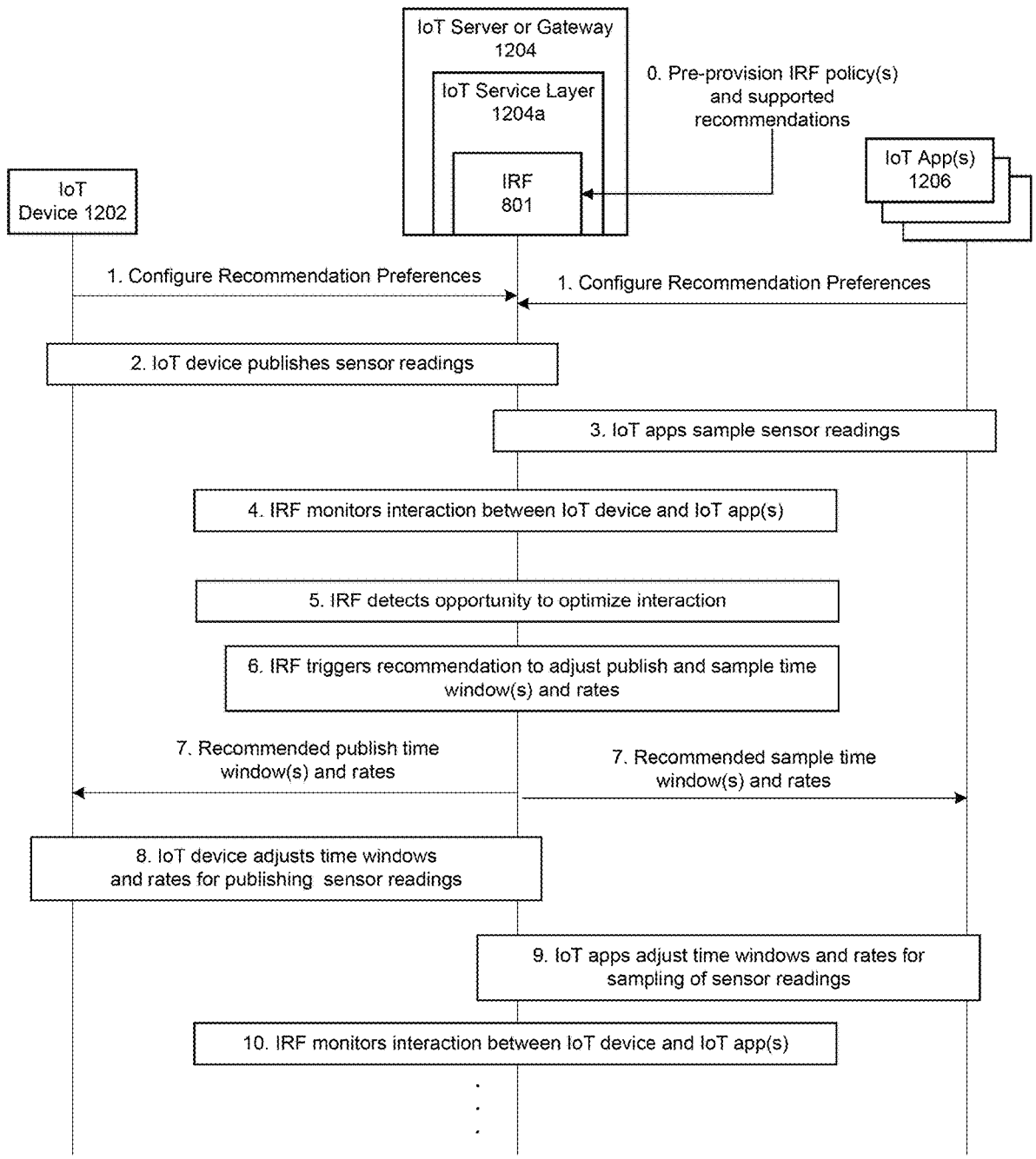
FIG. 12 is a call flow in which the IRF recommends a change to the publishing and sampling rates of an IoT sensor, in accordance with an example embodiment.
Figure 13:
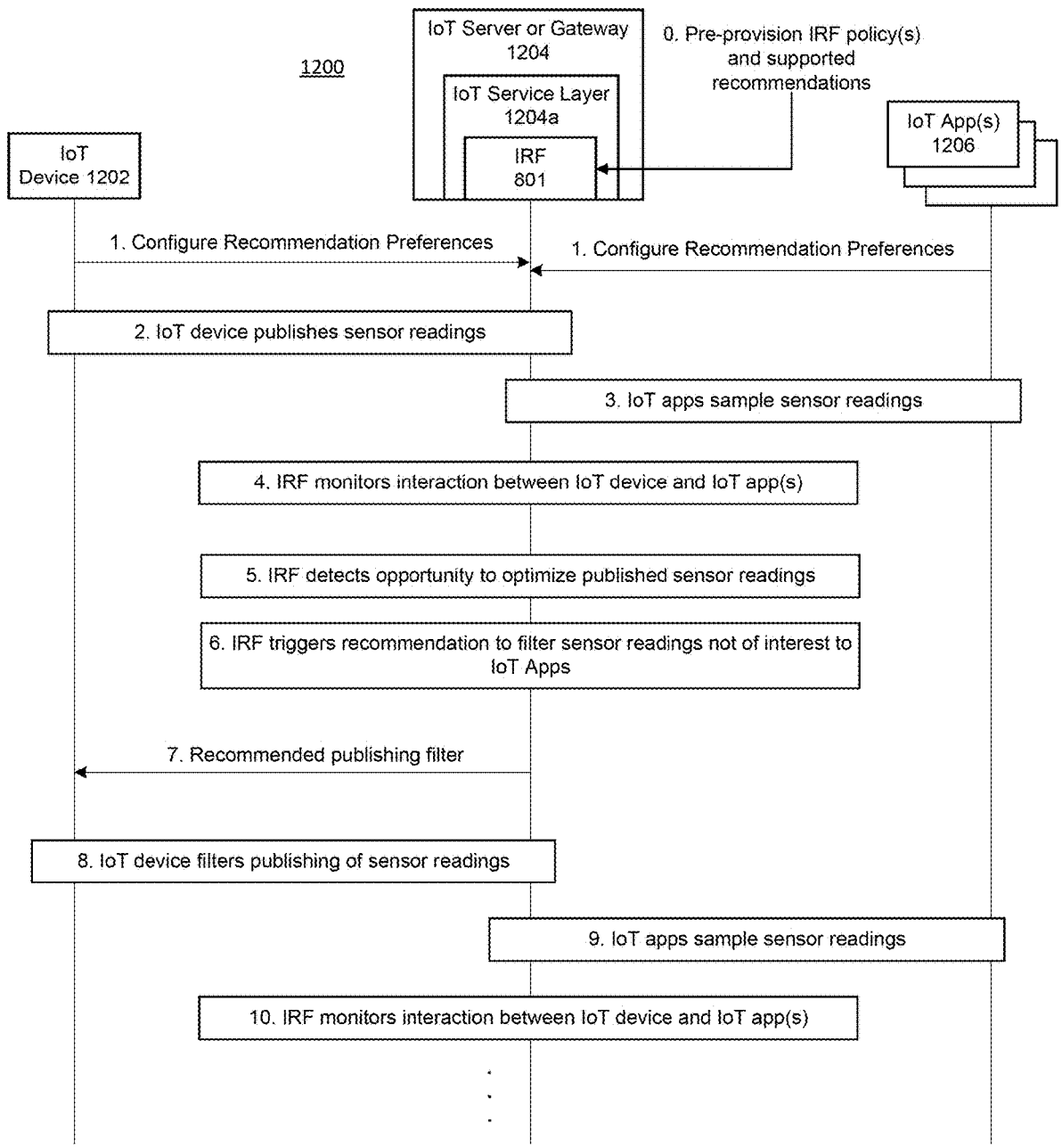
FIG. 13 is a call flow in which the IRF recommends filtering sensor readings that are not of interest, in accordance with an example embodiment.
Figure 14:
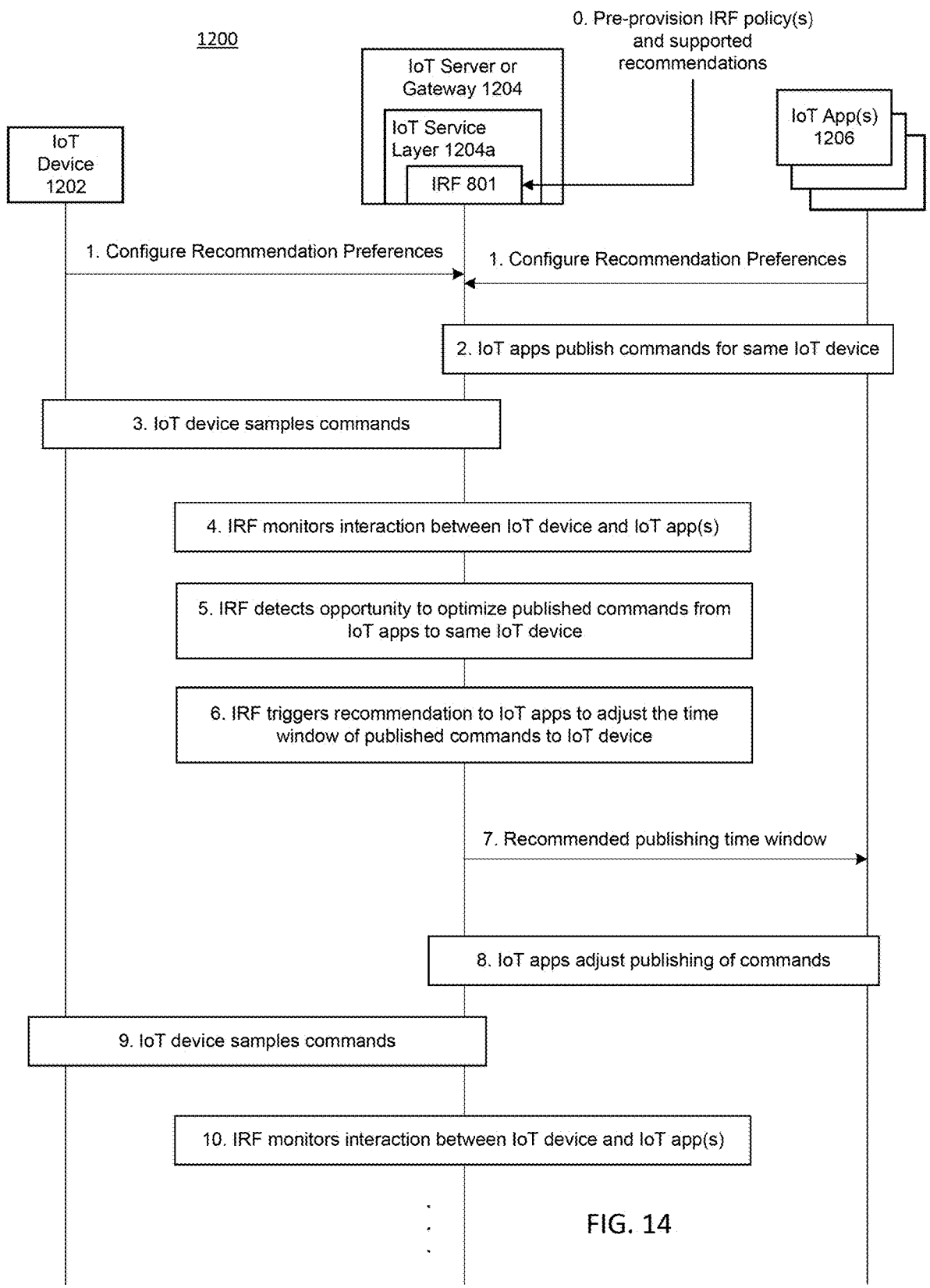
FIG. 14 is a call flow in which the IRF recommends a coordinated use of the same IoT device by multiple IoT apps, in accordance with an example embodiment.

Referring now generally to FIGS. 12-14, an example system 1200 includes one or more IoT devices 1202, an IoT server or gateway 1204 hosting an IoT service layer 1204a that supports the IRF 801, and one or more IoT apps 1206. It will be appreciated that the example system 1200 is simplified to facilitate description of the disclosed subject matter and is not intended to limit the scope of this disclosure. Other devices, systems, and configurations may be used to implement the embodiments disclosed herein in addition to, or instead of, a system such as the system illustrated in FIG. 12, and all such embodiments are contemplated as within the scope of the present disclosure.

Referring in particular to FIG. 12, the IRF 801 can be configured with IRF policies that define rules that the IRF 801 uses to detect non-optimal interaction between the IoT sensor device 1202 that publishes sensor readings to the IoT SL 1204a, and one or more IoT apps 1206 that sample these sensor readings from the IoT SL 1204a. The IRF 801 monitors the publish and sample requests that the IoT device 1202 and IoT apps 1206 make to the IoT SL 1204a. The IRF 801 can detect that there is a mismatch in the time windows and/or rate that sensor readings are published to the IoT SL 1204a by the IoT device 1202, compared to the time windows and/or rate that the sensor readings are sampled by the one or more IoT apps 1206. Upon detecting a mismatch, the IRF 801 can send one or more recommendations or instructions to the IoT device 1202 and/or IoT apps 1206 to adjust their respective publishing and sampling windows and/or rates such that they are aligned with one another.

It will be understood that the example illustrated in FIG. 12 is not limiting or exhaustive regarding the types of publishing and sampling time windows and rate adjustment recommendations that that the IRF 801 can issue. For example, the IRF 801 can, additionally or alternatively, issue recommendations to align the time windows and/or rate at which IoT apps publish actuator commands to the IoT SL, such that there is alignment with the time windows and rate at which an IoT device samples these commands from the IoT SL and processes them.

Referring to FIG. 12, in accordance with the illustrated example, at 0, IRF policies containing rules that provide guidance to the IRF 801 for the optimization of interaction between IoT devices 1202 and IoT apps 1206 can be pre-provisioned into the IRF 801 of the IoT SL 1204a. By way of example, without limitation, this information can be hard coded into the IRF 801 by a developer at the time of IRF development, pre-provisioned into the IRF 801 at the time of deployment, or configured using out-of-band mechanisms by a service provider that owns and operates the IRF 801 within its service platform. Examples of out-of-band mechanisms include, without limitation, a management portal that exposes a graphical user interface (GUI) that can be used by a service provider to configure and manage its platform, or a device management server that the service provider uses to push this information to the IRF 801. IRF policies can include information such as, but not limited to, the attributes defined in Table 1 herein.

At 1, in accordance with the illustrated example, individual IoT devices 1202 and apps 1206 can send requests to configure the IRF 801 of the IoT SL 1204a with IRF policies. The policies may convey their respective supported recommendation types and values. The policies may also, or alternatively, enable or disable the IRF 801 from sending them (devices and/or apps) recommendations. For example, a given IoT device or app can specify its supported sampling and publishing time windows, and max and min sampling and publishing rates. IRF policies can include information such as, but not limited to, the attributes defined in Table 1. In some cases, the IRF 801 can use this information to make an initial determination. The initial recommendation may be one that the IRF 801 can share with IoT devices 1202 and apps 1206 before the IRF 801 collects and observes actual requests from IoT devices 1202 and apps 1206 to publish and sample sensor readings to the IoT SL 1204a.

At 2, in accordance with the illustrated example, the IoT device 1202 publishes sensor readings to the IoT SL 1204a. This publishing can be done in a periodic manner (e.g., once an hour), based on an event (e.g., when detecting a sensor measurement exceeds a certain threshold), or the like. At 3, in accordance with the illustrated example, one or more IoT apps 1206 sample sensor readings from the IoT SL 1204, which were published by the IoT device 1202. This can be done in a polling manner (e.g., by sending a request to the IoT SL 1204a to retrieve a sensor reading). When polling, an IoT app 1206 can include criteria that further specify information in which it is interested. For example, the IoT app 1206 may include a filter criteria such as (value<50), which the IRF 801 can use to further assess the interests of the IoT app. Alternatively, this can be done in an event based manner. In an event based example, a given IoT app 1206 can subscribe to the IoT SL 1204a so as to receive a notification containing a sensor reading when the reading is published. This subscription can include criteria that defines when the IoT app 1206 wishes to receive a published sensor reading. For example, the criteria can specify that the IoT app 1206 wants to receive all published sensor readings or a subset of readings based on a specified criteria. By way of example, criteria may indicate that the IoT app 1206 wants to receive readings if/when the value of the sensor reading crosses a specified threshold, or when there is a presence or lack thereof of specific informational elements in a sensor reading.

With continuing reference to FIG. 12, at 4, in accordance with the illustrated example, the IRF 801 collects context information. Example context information may include, without limitation, the attributes defined in Table 2 herein. For example, the scheduled windows of time during which a given IoT device 1202 publishes sensor readings to the IoT SL 1204a, the scheduled windows of time during which IoT apps 1206 sample sensor readings from the IoT SL 1204a, the rates that the IoT device 1202 and IoT apps 1206 publish or sample sensor readings to or from the IoT SL 1204a during these time windows, the types of subscriptions created by IoT devices 1202 and apps 1206 to IoT SL resources of interest, and the notification criteria of each subscription.

At 5, the IRF 801 may analyze the IRF context and may compare it against IRF trigger criteria defined within IRF policies that have been configured into the IRF 801. The IRF trigger criteria can include attributes, by way of example and without limitation, which are defined in Table 1. For example, a trigger criteria may be a mismatch in the time windows or the rate in which an IoT device publishes sensor readings to the IoT SL 1204a as compared the rate of the one or more IoT apps 1206 that sample the published sensor readings from the IoT SL 1204a. In some cases in which more than one IoT app 1206 samples the published sensor readings originating from the same IoT device 1202, the IRF 801 can aggregate these sampling time windows and/or sampling rates together. The IRF 801 can then evaluate the aggregated sampling time windows and/or aggregated sampling rates of the IoT apps 1206 against the publishing time windows and/or publishing rate of the IoT device 1202.

At 6, based on the trigger criteria and collected context, the IRF 801 may evaluate whether any IRF trigger criteria have been met so as to issue recommendations to the applicable IoT device 1202 and/or the IoT apps 1206. Example trigger criteria include, for example and without limitation, the publishing and sampling time windows being offset by more than a specified time duration, or the publishing and sampling rates being different by more than a specified factor. In some cases, as an IoT device and/or app change their respective publishing or sampling time windows or rates, the IRF 801 can sample and detect these changes and make recommendations accordingly. In addition, the IRF 801 may support hysteresis functionality so as to filter out temporary or short term changes to sampling rates. Thus, the IRF 801 can limits its recommendations so that recommendations are not made too frequently for cases, for example, in which an IoT device or app makes a temporary publishing or sampling change and then reverts back to its original publishing or sample rate.

At 7, if/when an IRF trigger criteria has been met, the IRF 801 can generate recommendations to the applicable IoT device 1202 and/or IoT apps 1206, for example, based on recommendations defined within an IRF policy. For example, recommendations such as adjusting the publishing time window or adjusting the publishing rate can be specified by an IRF policy. The IRF 801 can issue recommendations to the one or more applicable IoT devices 1202 or apps 1206 defined within the IRF policy using one or more of the methods disclosed herein. For example, the IRF 801 can issue a recommendation by updating one or more of the recommendation resources that corresponds to each of the applicable IoT devices 1202 or apps 1206. This update can be made to a recommendation resource that is hosted on the IoT device 1202 or app 1206 itself, or one that is hosted by the IoT SL 1204a that the IoT device 1202 or app 1206 samples or subscribes to. The update can result in the modification to one or more attributes of the recommendation resource such as, but not limited, to the example applicable attributes defined in Table 3 herein. For example, the IRF 801 can update an IoT device's recommended publishing windows and/or its recommended publishing rate. In some cases, the IRF 801 of the IoT SL 1204a can also interact with an underlying network before/after issuing a recommendation to an IoT device 1202 or IoT app 1206. In doing so, the IRF 801 can align the recommendations it issues to IoT devices 1202 and apps 1206 with the configuration of the underlying network that is used for underlying communication between the IoT devices 1202 and apps 1206. For example, the IRF 801 can issue requests to the underlying cellular network to configure network resources and the sleep timers of a given IoT device such that they are aligned with the time windows and rate of requests issued by one or more IoT apps that target requests toward the IoT device. In an alternative example, this interaction with the underlying network can occur before or after other steps in the illustrated example (e.g., after Step 9).

At 8, in accordance with the illustrated example, upon receiving the recommendation from the IRF 801, the IoT device 1202 processes the recommendation and determines whether to accept or ignore the recommendation. For example, the device 1202 may determine whether or not to change its publishing time window and/or publishing rate. The decision whether to accept or reject the recommendation may be based on deployment or platform specific requirements that determine whether a recommendation is mandatory or optional. A given IoT device may return a response to a recommendation. The response may indicate whether or not the device accepted the recommendation. Based on this response, the IRF 801 can determine whether or not to issue future recommendations to that IoT device. The IoT device 1202 may update the recommendationStatus accordingly.

At 9, in accordance with the illustrated example, upon receiving the recommendation from the IRF 801, the IoT apps 1206 may process the recommendation and decide whether to accept or ignore the recommendation. For example, the IoT apps 1206 may determine whether or not to change their sampling time window and/or sampling rate. In some cases, the decision whether to accept or reject the recommendation may be based on deployment or platform specific requirements that determine whether a recommendation is mandatory or optional. A given IoT app may return a response to a recommendation indicating whether or not it accepted the recommendation. Based on this response, the IRF 801 can decide whether or not to issue future recommendations to that IoT app. The IoT app may update the recommendationStatus accordingly.

At 10, after issuing the recommendations to the respective IoT device 1202 and/or IoT apps 1206, the IRF 801 may continue to monitor SL requests issued by the IoT device 1202 and apps 1206. For example, the IRF 801 may monitor for adjustments to the time windows and rates of the requests to publish and sample to/from the IoT SL 1204a. While monitoring, the IRF 801 may continue to collect and assess IRF context against IRF policies to determine if/when to make further recommendations as described above with reference to example steps 4 to 10.

Referring now to FIG. 13, in accordance with the illustrated example, the IRF 801 recommends that sensor readings that are not of interest are filtered. The IRF 801 monitors the publish and sample requests that the IoT device 1202 and IoT apps 1204 make to the IoT SL 1204a. The IRF 801 detects that there is a lack of interest in some of the sensor readings that are published to the IoT SL 1204a by the IoT device 1202, for example, because none of the IoT apps 1206 are sampling these sensor readings. Based on this lack of interest, the IRF 801 sends one or more recommendations to the IoT device 1202 to filter some information contained within sensor readings it publishes and/or to filter and not publish sensor readings in their entirety during specified time windows. As a result, the size and/or number of published sensor readings is reduced, which optimizes resource utilization throughout the system, including resources of the IoT device 1202, IoT network, and/or IoT SL 1204*a*.

Steps 0-4 are described above with reference to FIG. 12. In addition, at 1, the IoT device 1202 or app 1206 can specify its supported sampling and publishing schemas. These schemas can convey to the IRF 801 the supported schema definition that a given IoT device or app is capable of using when publishing a given sensor reading or actuator command to the IoT SL 1204*a*. For example, an IoT device or app can include a schema definition in the IRF policy. An example schema is shown below, though it will be understood that alternative schemas may be included in an IRF policy. The schema can define the structure of the information that the IoT device or app publishes or samples to/from the IoT SL. The schema can include various information such as the name and order of the informational elements, as well as their data types and their cardinality. This information can be used by the IRF 801 to asses which informational elements are supported by an IoT app or device that publishes information to the IoT SL, as well as which information is of interest to an IoT app or device that samples information from an IoT SL.

```
<xs:schema>
  <xs:element name "environmental_sensor">
    <xs:sequence>
      <xs:element name "temperature" type="xs:float" minOccurs=0>
      <xs:element name "humidity" type="xs:float" minOccurs=0>
      <xs:element name "pressure" type="xs:float" minOccurs=0>
    </xs:sequence>
  </xs:element>
</xs:schema>
```

At 4, in accordance with the illustrated example, the IRF 801 collects context information regarding the requests initiated by the IoT device 1202 and IoT apps 1206 to publish and sample sensor readings to/from the IoT SL 1204*a*. The IRF context can include information such as, but not limited to, the example information defined in Table 2. For example, IRF context may include information contained within each sensor reading published by an IoT device and the information contained within each sampled sensor reading by an IoT app. Context collected for sampled sensor readings can be collected by monitoring the response returned by the IoT SL 1204*a* to requests issued by IoT apps 1206 to retrieve the sensor readings from the IoT SL 1204*a*. Alternatively context can be collected by monitoring the notifications that the IoT SL 1204*a* sends to IoT apps 1204*a* for corresponding subscriptions that the IoT apps 1206 have made to the IoT SL 1204*a* for the sensor readings. Based on this context, the IRF 801 can assess the interest of IoT apps 1206 with regard to the published sensor readings of the IoT device 1202.

At 5, in accordance with the illustrated example, the IRF 801 analyzes the IRF context and compares it against IRF trigger criteria defined within IRF policies that have been configured into the IRF 801. The IRF trigger criteria can include criteria, for example and without limitation, that is defined in Table 1. For example, a trigger criterion may be the detected occurrence of one or more informational elements that are published by an IoT device in a sensor reading but that are not sampled by an IoT app. In some cases in which more than one IoT app samples published sensor readings originating from the same IoT device, the IRF can aggregate the samples of the IoT apps and assess whether any IoT app had an interest in sensor readings from a particular device and optionally within a given time window.

At 6, based on the trigger criteria and collected context, the IRF 801 may evaluate whether any IRF trigger criteria have been met to trigger issuing recommendations to the IoT device 1202 and/or the IoT apps 1206 that interact with the IoT device 1202. For example, the occurrence of one or more informational elements that are published by an IoT device in a sensor reading but that are not sampled by any IoT apps or sensor readings in their entirety that are not sampled by any IoT apps may define a trigger criterion.

At 7, if/when an IRF trigger criterion has been met, the IRF 801 can generate one or more recommendations to the applicable IoT device 1202 and/or IoT apps 1206 based on recommendations defined within an IRF policy. For example, recommendation (e.g., adjusting the publishing filter) can be specified by an IRF policy along with the applicable IoT device defined within the IRF policy. The IRF can issue recommendations to the one or more applicable IoT devices 1202 or apps 1206 defined within the IRF policy using one or more of the aspects for issuing recommendations or instructions described herein. For example, the IRF 801 can issue a given recommendation by updating one or more recommendation resources that correspond with the applicable IoT device 1202. This update can be made to a recommendation resource that is hosted on the IoT device itself, or one that is hosted by the IoT SL 1204*a* and from which the IoT device samples or to which the IoT device subscribes. The update can result in the modification of one or more attributes of the recommendation resource such as, but not limited to, the applicable attributes defined in Table 3. For example, the IRF 801 can update an IoT device's recommended publishing filter.

At 8, in accordance with the illustrated example, upon receiving the recommendation from the IRF 801, the IoT device 1202 processes the recommendation and decides whether to accept or ignore the recommendation. For example, the device 1202 may determine whether or not to filter specific informational elements from the sensor readings it publishes or to filter entire sensor readings. This filtering can optionally be done within certain time windows defined by the recommendation. The decision whether to accept or reject the recommendation may be based on deployment or platform specific requirements that determine whether a recommendation is mandatory or optional. An IoT device may return a response to a recommendation indicating whether or not it accepted the recommendation. Based on this response, an IRF can decide whether or not to issue future recommendations to that IoT device. The IoT device may update the recommendationStatus accordingly. At 9, the IoT apps 1206 may sample readings as described above at 3. Step 10 may proceed as described above with reference to FIG. 12 (at 10).

Referring now to FIG. 14, in accordance with the example, the IRF 801 is configured with IRF policies that define rules that the IRF 801 uses to detect non-optimal interaction between an IoT actuator device 1202 that samples commands from the IoT SL 1204*a* and one or more IoT apps 1206 that publish these commands to the IoT SL 1204*a* for the IoT device 1202. The IRF 801 may monitor the publish and sample requests that the IoT apps 1206 and IoT device 1202 make to the IoT SL 1204*a*. The IRF 801 detects that multiple IoT apps 1206 are sending commands to the same IoT device 1202 in an uncoordinated manner, such that the IoT device 1202 may be required to sample and process these requests individually with significant offsets/delays between each command. Based on this lack of coordination, the IRF 801 may then send one or more recommendations to the IoT apps 1206 to adjust the time windows in which they publish commands targeting the IoT device 1202, such that the commands are issued in a more consolidated time window having a shorter duration. The IRF 801 can also send recommendations to the IoT apps 1206 to adjust the rate they publish commands targeting the IoT device 1202, such that the rate of commands do not overwhelm the IoT device 1202. These recommendations may allow the IoT device 1202 to sample and process commands from the IoT apps 1206 in a consolidated time window while not being overwhelmed by the rate of requests. As a result, in some cases, the IoT device 1202 is able to sleep for longer durations of time without being bothered to process requests from IoT apps 1206. This may optimize resource utilization throughout the system, including, for example, resources of the IoT device, IoT network, and IoT SL.

Steps 0-3 are described above with reference to FIG. 12. At 4, in accordance with the illustrated example, the IRF 801 collects context information regarding the requests initiated by IoT apps 1206 to publish commands to/from the IoT SL 1204*a* that target the same IoT device 1202. The IRF context can include information such as, but not limited to, the example information defined in Table 2. For example, IRF context can include the scheduled windows of time and/or rate that the IoT apps 1206 publish commands to the IoT SL 1204*a*, and the scheduled windows of time and/or rate that an IoT device 1202 samples and processes these commands from the IoT SL 1204*a*.

At 5, in accordance with the illustrated example, the IRF 801 analyzes the IRF context and compares it against IRF trigger criteria defined within IRF policies that have been configured into the IRF. The IRF trigger criteria can include criteria such, as but not limited to, the criteria defined in Table 1. For example, a trigger criteria may be a mismatch (difference) in the time windows and/or rate in which one or more IoT apps publish commands to the IoT SL as compared to the time windows and/or the rate of the IoT device that samples the published commands from the IoT SL. In some cases in which more than one IoT app publishes commands toward the same IoT device, the IRF 801 can aggregate these publishing time windows and/or publishing rates together. The IRF 801 can then evaluate the aggregated publishing time windows and/or aggregated publishing rates of the IoT apps against the sampling time windows and/or sampling rate of the IoT device.

At 6, based on the trigger criteria and collected context, the IRF 801 may evaluate whether any IRF trigger criteria have been met to trigger issuing recommendations to the IoT apps 1206 that interact with the IoT device 1202. Example triggers include when publishing time windows of the IoT apps targeting the same IoT device are not aligned and exceed a specified offset, or the publishing rates of the IoT apps exceed a specified threshold associated with, for instance equivalent to, the maximum sampling rate of the targeted IoT device.

At 7, in accordance with the illustrated example, if/when an IRF trigger criterion has been met, the IRF 801 can generate one or more recommendations to the applicable IoT apps based on recommendations defined within an IRF policy. For example, recommendations that include adjusting the publishing time window or rate can be specified by an IRF policy along with the applicable IoT apps defined within the IRF policy. The IRF can issue recommendations to the one or more applicable IoT devices or apps defined within the IRF policy, using one or more of the methods described herein. For example, the IRF 801 can issue the recommendation by updating a recommendation resources that corresponds with the applicable IoT apps. These updates can be made to a recommendation resource that are hosted on the IoT apps 1206, or ones that are hosted by the IoT SL 1204*a* and which the IoT apps sample or subscribe to. The update can result in the modification to one or more attributes of the recommendation resource such as, but not limited to, the applicable attributes defined in Table 3. For example, the IRF 801 can update an IoT app's recommended publishing time window or rate.

At 8, upon receiving the recommendations from the IRF 801, the IoT apps 1206 may process the recommendations and decide whether to accept or ignore the recommendation. For example, a given IoT app 1206 may decide whether or not to change its publishing time window and/or rates. The decision whether to accept or reject the recommendation may be based on deployment or platform specific requirements that determine whether a recommendation is mandatory or optional. An IoT app 1206 may return a response to a recommendation indicating whether or not it accepted the recommendation. Based on this response, the IRF 801 can decide whether or not to issue future recommendations to that IoT app. The IoT device may update the recommendationStatus accordingly. At 9, the IoT apps 1206 may sample readings as described above (at 3). Step 10 may proceed as described above with reference to FIG. 12 (at 10).

Figure 15:
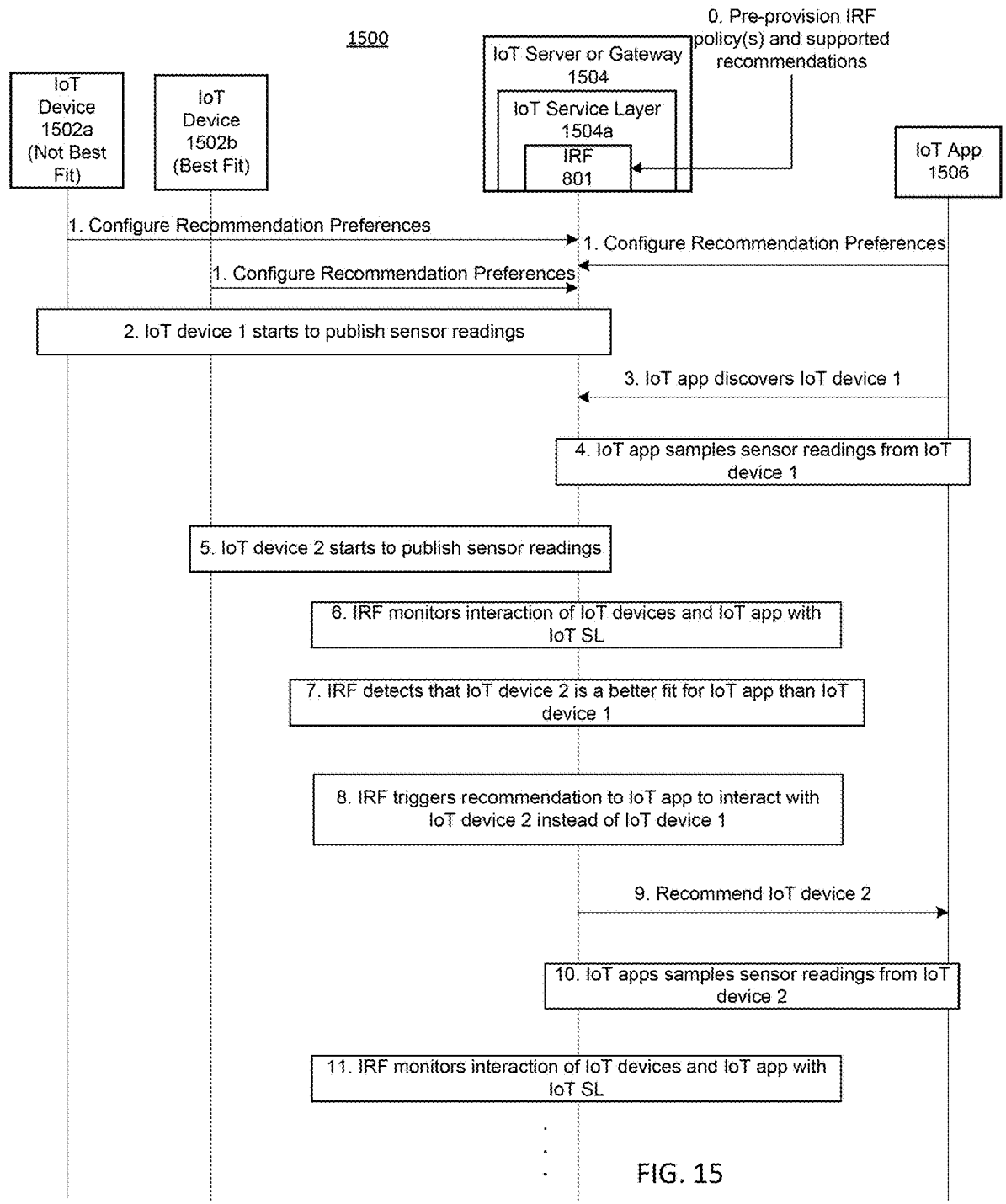
FIG. 15 is a call flow in which the IRF recommends an IoT app change its targeted IoT device, in accordance with an example embodiment.

Referring now to FIG. 15, an example system 1500 includes a first IoT devices 1502*a*, a second IoT device 1502*b*, an IoT server or gateway 1504 hosting an IoT service layer 1504*a* that supports the IRF 801, and an IoT apps 1506. It will be appreciated that the example system 1500 is simplified to facilitate description of the disclosed subject matter and is not intended to limit the scope of this disclosure. Other devices, systems, and configurations may be used to implement the embodiments disclosed herein in addition to, or instead of, a system such as the system illustrated in FIG. 15, and all such embodiments are contemplated as within the scope of the present disclosure.

In accordance with the illustrated example, the IRF 801 monitors the publish and sample requests that IoT apps and IoT devices make to the IoT SL. The IRF 801 detects that the IoT app 1506 discovers and starts to interact with the first IoT device 1502*a*. However, unbeknown to the IoT app 1506, there is another IoT device (IoT device 1502*b*) available that is better suited for the IoT app 1506 to interact with. For example, the second IoT device 1502*b* may publish sensor readings during a time window in which the IoT app 1506 is interested in sampling the sensor readings. Alternatively, or additionally, the publishing rate of the sensor readings from the second IoT device 1502*b* may align better with the sampling rate of interest of the IoT app 1506, or the information published by the second IoT device 1502*b* in its sensor readings may align better with the type of information that the IoT app 1506 is interested in sampling, or the second IoT device 1506*b* may reside in a location that is in closer proximity to the IoT app 1506, or the second IoT device 1506 may be otherwise better suited to service requests from the IoT app 1506 based on its current state (e.g., IoT device 1506*b* may have a fully charged battery compared to IoT device 1502*a* that might not). Matching up IoT devices with IoT apps that are best suited for one another can help optimize and/or load balance resources throughout the system. It can also help provide IoT apps with better quality of service and user experience.

Steps 0 and 1 can be performed as described in accordance with steps 0 and 1 described above with reference to FIG. 12. In addition, at 1, an IoT device or app can specify its supported sampling and publishing schemas. These schemas can convey to the IRF the supported schema definition that an IoT device or app is capable of using when publishing a given sensor reading or actuator command to the IoT SL. At 2, the first IoT device 1502a starts to publish sensor readings to IoT SL 1504a. At 3, in accordance with the illustrated example, the IoT app 1506 issues a discovery request to the IoT SL 1504a and discovers the first IoT device 1502a. At 4, the IoT app 1506 may start to sample sensor readings from the IoT SL 1504a that were published by the first IoT device 1502a. At 5, the second IoT device 1502b starts to publish sensor readings to the IoT SL 1504a.

At 6, in accordance with the illustrated example, the IRF 801 collects context information regarding the requests initiated by the first and second IoT devices 1502a and 1502b and the IoT app 1506, to the IoT SL. The IRF context can include information such as, but not limited to, the information defined in Table 2. For example, the IRF context may include information contained within each sensor reading published by both IoT devices 1502a and 1502b and the information contained within each sampled sensor reading by the IoT app 1506. In some examples, context collected for sampled sensor readings can be collected by monitoring the response to requests issued by the IoT app 1506 to retrieve the sensor readings from the IoT SL 1504a, or by monitoring the notifications that the IoT SL 1504a sends to the IoT app 1506 for corresponding subscriptions that the IoT app 1506 has made to the IoT SL 1504a for the sensor readings. Based on this context, the IRF 801 can assess the interest of the IoT app 1506 with regard to the published sensor readings of the IoT devices. The IRF 801 can also access devices, for instance all devices, which are publishing matching information (e.g., resources) that are of interest to the IoT app. The IRF 801 may continue to monitor these devices to determine their publishing rates, time windows, and published information. The IRF 801 can also collect other context such as the physical location of the IoT devices and the IoT app as well as their location in the underlying network. The IRF 801 can also collect context related to the congestion levels in the areas of the network in which the IoT devices and IoT app are located. The IRF 801 can also collect device related context such as the battery level and security level of the IoT devices.

At 7, the IRF 801 may analyze the IRF context and may compare it against IRF trigger criteria defined within IRF policies that have been configured into the IRF. The IRF trigger criteria can include criteria such as, for example and without limitation, the criteria defined in Table 1. For example, a trigger criteria may be the detected occurrence of one or more informational elements that are published by an IoT device in a sensor reading but that are not sampled by an IoT app within a certain time duration defined by the criteria. Or a criteria may be that the sampling rate or sampling time window does not align with one of the IoT devices but does align with the other. Or a criteria may be that the IoT app only accesses IoT devices with battery level above a certain percentage or that are located in non-congested areas of the network. The IRF 801 can evaluate criteria against the first and second IoT devices 1502a and 1502b and the IoT app 1506 to detect if/when a better candidate IoT device is available for the IoT app 1506 to switch over to and interact with.

At 8, based on the trigger criteria and collected context, the IRF 801 evaluates whether any IRF trigger criteria have been met to trigger issuing recommendations to the IoT device and/or the IoT apps that interact with the IoT device.

For example, a trigger criterion may include the occurrence of one or more informational elements that are published by an IoT device in a sensor reading, but that are not sampled by any IoT apps within a certain time duration defined by the criterion. Triggers may also include sensor readings in their entirety that are not sampled by any IoT apps within a certain time duration defined by the criteria. In the illustrated example, the IRF 801 detects that the second IoT device 1502b is a better fit for the IoT app 1506, rather than the first IoT device 1502a. The IRF 801 can make this determination by comparing the published sensor readings of the IoT devices against preferences provided by the IoT app. For example, the IoT app can specify its supported sampling schema, its supported sampling time windows, and/or it min and max sampling rates. The IRF 801 can compare these preferences against the observed published sensor readings from the IoT devices. The IRF can then determine which IoT device is best suited to be sampled by the IoT app, and make a corresponding recommendation to the IoT app to sample this device.

At 9, if/when an IRF trigger criterion has been met, the IRF 801 can generate one or more recommendations to the applicable IoT device and/or IoT apps based on recommendations defined within an IRF policy. For example, recommendations that include switching to a different IoT device can be specified by an IRF policy. The IRF 801 can issue recommendations to the IoT app defined within the IRF policy using one or more of the methods described herein. For example, the IRF 801 can issue the recommendation by updating recommendation resources that correspond with the applicable IoT app. This update can be made to a recommendation resource that is hosted on the IoT app itself, or one that is hosted by the IoT SL and which the IoT app samples or subscribes to. The update can result in the modification to one or more attributes of the recommendation resource such as, for example and without limitation, the applicable attributes defined in Table 3. For example, the IRF 801 can update an IoT app's reccomendedEntities attribute to recommend that it switch to interacting with the second IoT device 1502b.

At 10, in accordance with the illustrated example, upon receiving the recommendation from the IRF 801, the IoT app 1506 processes the recommendation and decides whether to accept or ignore the recommendation. For example, the IoT apply can determine whether to switch to sampling sensor readings from the second device 1502b instead of the first device 1502a. The decision whether to accept or reject the recommendation may be based on deployment or platform specific requirements that determine whether a recommendation is mandatory or optional. The IoT app 1506 may return a response to a recommendation indicating whether or not it accepted the recommendation. Based on this response, the IRF 801 can decide whether or not to issue future recommendations to that IoT app 1506. The IoT app 1506 may update the recommendationStatus accordingly. At 11, the IRF may continue to monitor interactions as further described with reference to FIG. 12 (at 10).

IRF policies will now be further discussed. The IRF 801 can be configured with IRF policies that define rules that the IRF 801 can use to optimize the end-to-end interaction between IoT devices and apps. An IRF policy can be used to convey to the IRF 801 various information, such as the applicable IoT devices and apps, if/when to issue recommendations to these IoT devices and apps, the types of recommendations and the recommendation values or limits supported by particular IoT devices or apps, trigger criteria defining if/when to issue a recommendation and the type of recommendation to issue, etc.

In some examples, individual IoT devices and apps as well as other entities (e.g. system administrators) can send requests to the IRF to create IRF policies. Requests to create, update or delete IRF policies can be issued at various times. For example, when an IoT device or app registers to the IoT SL it can create IRF policies in the IoT SL. This can also be done sometime thereafter. This action may also be triggered by a user who is handling a device. For example, the user may use a GUI to configure information into the IoT device or app that initiates the sending of a request to create an IRF policy.

An IRF policy can have various attributes. Table 1 lists example IRF policy attributes, but it will be understood that attributes within the scope of this disclosure are not limited to the attributes shown in Table 1.

TABLE 1

Example IRF Policy Attributes

| Attribute | Description |
| --- | --- |
| IRF ID | Indentity(s) of the IRF(s) that are allowed to send recommendations to the applicable entities that correspond to this policy. |
| enable | Used to enable or disable the IRF from sending recommendations to the applicable IoT devices or apps. This attribute can be simple boolean value (e.g. TRUE or FALSE) or can be a more complex schedule defining time window(s) when recommendations are enabled and disabled. |
| policyType | A type of IRF recommendations applicable to this policy such as the following:<br>Rate Control - Used to issue recommendations to align rate of requests exchanged between IoT devices and apps<br>Filter Policy - Used to issue recommendations to filter informational elements included or excluded in a sensor readings or actuator commands exchanged between IoT devices and apps.<br>Switch entities - Used to issue recommendations to have an IoT app switch the IoT device(s) it interacts with if/when there is a better suited IoT device<br>Delete unused data - Used to issue recommendations to CSEs to delete published data (e.g. resources) that are no longer of interest to IoT devices or apps. For example, an IRF may detect that once published and after being sampled for the first time, a resource is not sampled again. In this case, the IRF can recommend that the resource be deleted. |
| priority | A priority of the IRF policy and/or the individual recommendations specified within a given policy. The IRF can use a priority for cases where multiple policies may conflict or overlap with one another. For example, a policy for sending recommendations to control the sampling rate of a targeted resource may conflict with a policy to control the publishing rate of the same targeted resource. In this case, the IRF can use the priority to determine which policy overrides the other.<br>A priority can also be used by an IRF for cases where multiple recommendations are specified in the same IRF policy. An IRF can use this priority to determine which recommendation(s) to favor over others and issue in these cases. |
| applicableTargets | A list of identifiers of one or more targets (e.g. IoT SL resources) that this IRF policy is applicable to. An IRF will monitor and collect context related to requests that the applicable entities issue towards these targets. This information can either be provisioned into the policy in advance or the IRF can glean this information when monitoring the requests issued by IoT devices and apps to the IoT SL. This can be an explicit list containing identifiers of one or more targets or alternatively this list can include wild cards to specify a collection or all targets. |
| applicableEntities | A list of identifiers of one or more IoT devices or apps that this IRF policy is applicable to and that the IRF can issue recommendations to. An IRF can monitor and collect context related to the requests from these entities that are targeted towards applicable targets defined by this policy. Based on this context and the policies and recommendations defined by this policy, the IRF can make recommendations to these entities. This |

TABLE 1-continued

Example IRF Policy Attributes

| Attribute | Description |
|---|---|
| | information can either be provisioned into the policy in advance or the IRF can glean this information when monitoring the requests issued by IoT devices and apps to the IoT SL. |
| maxSupportedPublishingRate(s) | Used to convey to the IRF the maximum supported publishing rate of an IoT device or app (e.g. 15 publishes/minute). This publishing rate can be given in terms of the aggregated publishing rate or an individual publishing rate. For example, the rate an IoT device issues requests to the IoT SL to publish a single type of sensor reading or multiple types of sensor readings. |
| minSupportedPublishingRate(s) | Used to convey to the IRF the minimum supported publishing rate of an IoT device or app (e.g. 1 publish/minute) This publishing rate can be given in terms of the aggregated publishing rate or an individual publishing rate. For example, the rate an IoT device issues requests to the IoT SL to publish a single type of sensor reading or multiple types of sensor readings. |
| maxSupportedSamplingRate(s) | Used to convey to the IRF the maximum supported sampling rate of an IoT device or app (e.g. 15 samples/minute). This sampling rate can be given in terms of the aggregated sampling rate or an individual sampling rate. For example, the rate an IoT app issues requests to the IoT SL to sample a single device or multiple devices. |
| minSupportedSamplingRate(s) | Used to convey to the IRF the minimum supported sampling rate of an IoT device or app (e.g. 1 sample/minute). This sampling rate can be given in terms of the aggregated sampling rate or an individual sampling rate. For example, the rate an IoT app issues requests to the IoT SL to sample a single device or multiple devices. |
| maxSupportedLongPollingRate | Used to convey to the IRF the maximum supported long polling rate of an IoT device or app (e.g. 1 polling request/minute) |
| minSupportedLongPollingRate | Used to convey to the IRF the minimum supported long polling rate of an IoT device or app (e.g. 1 polling request/minute) |
| supportedPublishingWindows | Used to convey to the IRF the supported publishing time window(s) that an IoT device or app is capable of publishing sensor readings or actuator commands to the IoT SL. The window can be given in terms of absolute time (e.g. Tusedays from 1 to 2pm) or relative time (e.g. once every 24 hours). |
| supportedSamplingWindows | Used to convey to the IRF the supported sampling time window(s) that an IoT device or app is capable of sampling sensor readings or actuator commands from the IoT SL. The window can be given in terms of absolute time (e.g. Tusedays from 1 to 2pm) or relative time (e.g. once every 24 hours). |
| supportLongPollingWindows | Used to convey to the IRF the supported long polling time window(s) that an IoT device or app is capable of issuing long polling requests to the IoT SL. |
| supportedPublishingSchema | Used to convey to the IRF the supported schema or semantic definition that an IoT device or app is capable of using when publishing a given sensor reading or actuator command to the IoT SL. |
| supportedSamplingSchema | Used to convey to the IRF the supported schema or semantic definition that an IoT device or app supports for sampling a given sensor reading or actuator command from the IoT SL. |
| triggerCriteria | Conditions that must be met for the IRF to trigger optimizing the interaction between an IoT device and one or more IoT apps that interact with the device. Such as: A publishing and sampling time window mismatch that exceeds a certain threshold defined by the criteria. For example, a threshold given as a percentage (e.g. less than 20% overlap) or a value (e.g. less than 1 minute of overlap). A publishing and sampling rate mismatch that exceeds a certain threshold defined by the criteria. For example, a threshold given as a percentage (e.g. more than 50% difference in rates). |

TABLE 1-continued

Example IRF Policy Attributes

| Attribute | Description |
| --- | --- |
|  | The detected occurrence of one or more informational elements that are published but that are not sampled or not sampled within a certain time duration defined by the criteria. For example, information published and never sampled or published but not sampled within 24 hours. |
| recommendations | A list of one or more recommendations that the IRF makes to the applicable IoT devices and IoT apps if/when the IRF trigger criteria have been met. Some IRF recommendations can include: Adjust the publishing time window(s) Adjust the sampling time window(s) Adjust the publishing rate Adjust the sampling rate Adjust the publishing filter Adjust the sampling filter Switch entities Adjust the long polling rate for devices or apps Delete information (e.g. a resource) An individual IRF recommendation can involve the IRF issuing a recommendation to one or more IoT devices or apps. Each recommendation can include information such as but not limited to the attributes defined in Error! Reference source not found.. |
| recommendationMethod | Method by which the IRF is to issue a recommendations to applicable entities. Some methods for issuing IRF recommendations can include: Recommendation via SL recommendation resource Recommendation via Device Management Recommendation via Device Trigger Recommendation via SL request or response message parameter |
| recommendationResource | Information regarding the location, link or path to a recommendation resource which the IRF uses to issue a recommendation to the applicable entities. For example a URI of a SL recommendation resource or device management resource. |
| recommendationACPs | Access control policies that contain privileges defining which IRFs are allowed to issue recommendations to the applicable entities and the allowed types of recommendations and then allowed schedules of when recommendations can be issued. |

IRF Context will be now be discussed in further detail. The IRF 801 can dynamically collect context pertinent to the interaction taking place between an IoT device and one or more IoT apps. The IRF 801 can collect this context during normal SL operation (i.e. during the processing of incoming requests and outgoing responses to/from the SL and the IoT devices and IoT apps). Alternatively, IoT devices and apps can explicitly provide context to the IRF 801. For example, IoT devices or apps can explicitly configure the IRF 801 with context or they can include IRF context in other SL requests and responses that they issue. The IRF 801 can determine which context it needs to collect based on the IRF trigger criteria defined in the IRF policies it is configured with. The IRF 801 can then analyze this collected context against IRF policies to detect if/when to recommend that the applicable IoT devices and/or IoT app(s) make changes to optimize their interaction with one another.

Example IRF context is included in Table 2, but it will be understood that IRF context that is within the scope of this disclosure is not limited to the context shown in Table 2.

TABLE 2

Example IRF Context

| Attribute | Description |
| --- | --- |
| publishingWindow | Detected time window when sensor readings are published by an IoT device (E.g. Wednesdays from 2:00 to 2:15pm). The IRF can make use of the supportedPublishingWindow information that is provided in the IRF policy to assist in detecting the actual publishing window (e.g. the relative duration of the publishing window). The actual method used by an IRF for computing the publishingWindow can vary based on implementation/deployment requirements and is out of scope of this paper. |

TABLE 2-continued

Example IRF Context

| Attribute | Description |
| --- | --- |
| samplingWindow | Detected time window when sensor readings are sampled by one or more IoT apps (e.g. Wednesdays from 2:00 to 2:15pm). The IRF can make use of the supportedSamplingWindow information that is provided in the IRF policy to assist in detecting the actual sampling window (e.g. the relative duration of a sampling window). The actual method used by an IRF for computing the samplingWindow can vary based on implementation/deployment requirements and is out of scope of this paper. |
| publishingRate | Detected rate of publishing of sensor readings by an IoT device within a given window of time (e.g. 1 published reading/minute). The IRF can make use of the supportedPublishingWindow information (e.g. the duration of the publishing window) that is provided in the IRF policy to assist in detecting the actual publishing rate. The actual method used by an IRF for computing the publishing rate can vary based on implementation/deployment requirements and is out of scope of this paper. |
| samplingRate | Detected rate of sensor readings (from the same IoT device) being sampled by one or more IoT apps within a given window of time (e.g. 1 sample/minute). The IRF can make use of the supportedSamplingWindow information (e.g. the duration of the sampling window) that is provided in the IRF policy to assist in detecting the actual sampling rate. The actual method used by an IRF for computing the sampling rate can vary based on implementation/deployment requirements and is out of scope of this paper. |
| publishedInformation | Informational elements published by IoT devices and IoT apps to the IoT SL. For example, data elements included in a sensor reading or an actuator command published to the SL. Can also include semantic information regarding the published |
| sampledInformation | Informational elements sampled by IoT devices and IoT apps from the IoT SL. For example, elements included in a sensor reading or actuator command retrieved from the IoT SL or included in a notification that is sent by the IoT SL as a result of a subscription that was made to the IoT SL by an IoT device or app. |
| subscribedToInformation | IoT SL resources subscribed to by the IoT device and apps and the notification criteria defined by the subscriptions. This information can be used to glean what resources and what individual attributes of those resources an IoT device or app is interested in. |
| longPollingRate | Detected rate that an IoT device or app polls the IoT SL to sample sensor readings or commands that have been published to the SL by other IoT devices or apps (e.g. 1 polling request/minute) |
| longPollingWindow | Detected window of time(s) when IoT device or app issues long polling requests to sample sensor readings or commands that have been published to the SL by other IoT devices or apps (e.g. Wednesdays from 2:00 to 2:15pm). |

IRF Recommendations are now further discussed. The IRF 801 can issue recommendations to IoT devices or apps to have them change the way they directly interact with the IoT SL, and in turn adjust how they indirectly interact with other IoT devices or IoT apps. For example, the IRF 801 can recommend that an IoT device or app increase or decrease the rate at which it publishes or samples sensor readings from the IoT SL.

Recommendations can be issued by the IRF 801 to IoT devices and apps using several different mechanisms, some of which are now described for purposes of example.

In an example, a recommendation resource may be hosted by the IoT SL or by the IoT device or app itself. This resource can be updated by the IRF with recommendations. If the recommendation resource is created and hosted by the IRF, the IoT device or app can optionally subscribe to the IoT SL to receive recommendations from the IRF if/when the IRF makes updates to this resource. Alternatively, an IoT device or app can poll a recommendation resource hosted by the IoT SL to receive recommendations from the IRF.

Recommendation resources can be instantiated as child resource of other IoT SL or linked to other IoT SL resources. This can define the scope and purpose of a recommendation. For example, a recommendation resource can be created as a child of IoT SL resource where sensor readings for a particular sensor are stored. Alternatively, a recommendation resource can be created as a child of IoT SL resource that represents an IoT device or app. This defined scope allows the IRF to issue recommendations applicable to a specific sensor on an IoT device or recommendations applicable to the entire device.

In another example, a recommendation is embedded within a trigger request that is issued by the IoT SL and delivered to the IoT device or app via a SL request or via an underlying network triggering function. For example, a recommendation can be embedded within the payload of a 3GPP device trigger request. In this case, the IRF may need to interwork with a device triggering function to encapsulate within a trigger payload. The device triggering function may need to support the capability of embedding recommendations into trigger payloads.

In another example, a recommendation is embedded within a device management request that is issued by the IoT SL and delivered to the IoT device or app via an underlying device management framework and that targets a device management object or resource. For example, a recommendation can be embedded within a new software image that is downloaded and installed onto a device or included in a device configuration request to change the settings of a device. In this case, the IRF 801 may need to interwork with a device management function to convey recommendations to it in advance of issuing the recommendations to the device. The device management function may need to support the capability of embedding recommendations into firmware images that are built dynamically on the fly. These firmware images may then be shared with the devices.

In yet another example, a recommendation is embedded within other types of SL request primitives that are defined by a particular SL technology. For example, a particular SL technology may define a specialized primitive type for issuing recommendations to the IoT devices and apps.

Issuing of a recommendation by the IRF 801 can be conditioned on whether the IRF 801 has proper privileges to issue the recommendation to the applicable IoT device or app. The IRF 801 can check the access control policies defined within a corresponding IRF policy to determine whether it has the proper privileges to issue a recommendation.

Figure 3:
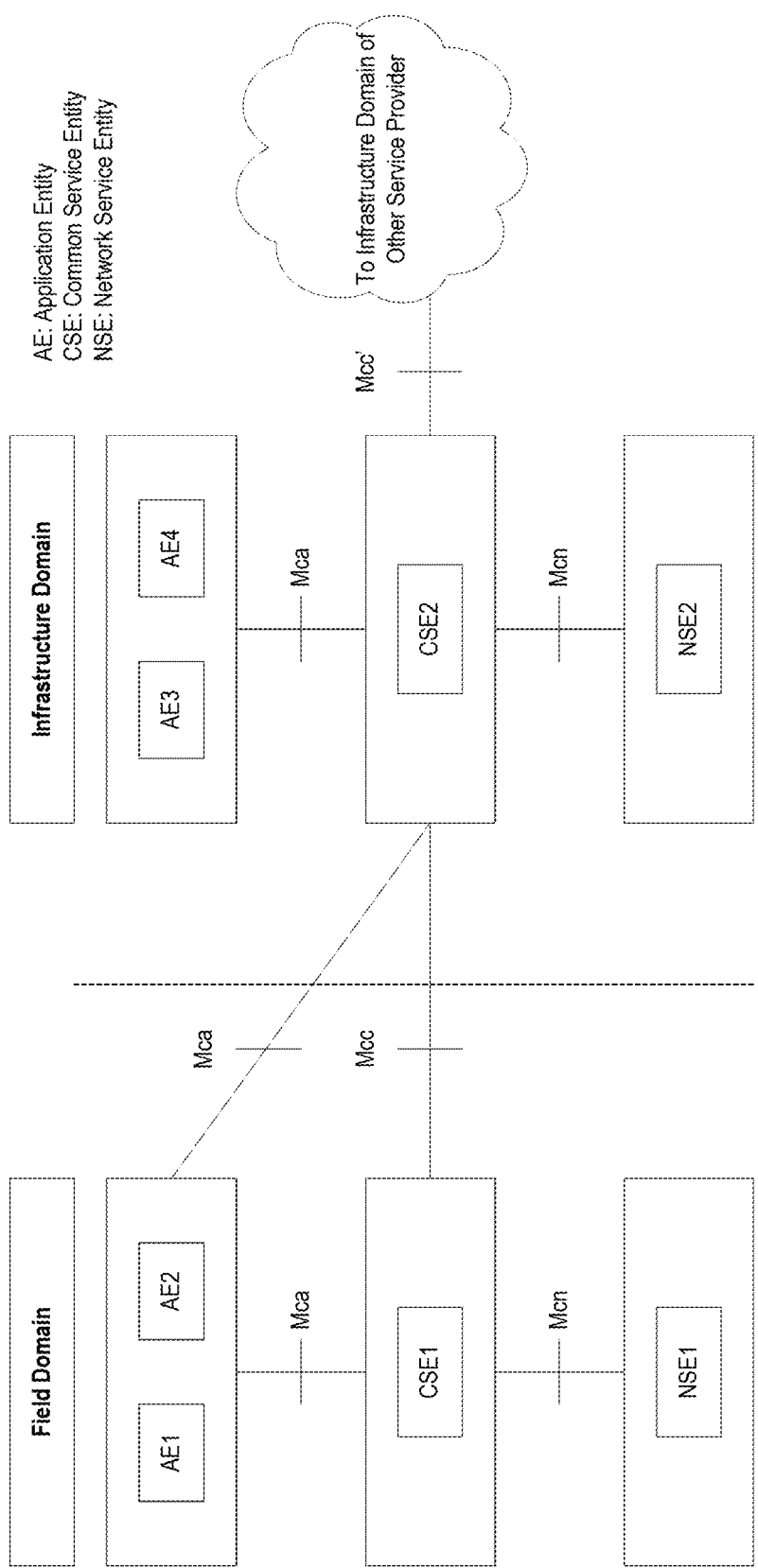
FIG. 3 is an example block diagram of the oneM2M architecture.

A recommendation can include various attributes, such as example attributes listed in Table 3. It will be understood that recommendation attributes that are within the scope of this disclosure are not limited to the example attributes shown in FIG. 3.

TABLE 3

Example Recommendation Attributes

| Attribute | Description |
| --- | --- |
| applicableEntities | A list of identifiers of IoT devices or apps for which this recommendation is targeted towards. |
| recommendedPublishingWindows | Publishing time window(s) that IRF recommends to IoT device or app (e.g. Wednesdays from 2:00 to 2:15pm) |
| recommendedPublishingRate | Publishing rate that IRF recommends to IoT device or app (e.g. 5 publishes/minute) |
| recommendedSamplingWindows | Sampling time window(s) that IRF recommends to IoT device or app (e.g. Wednesdays from 2:00 to 2:15pm) |
| recommendedSamplingRate | Sampling rate that IRF recommends to IoT device or app (e.g. 5 samples/minute) |
| recommendedPublishingFilter | Filter that IRF recommends that an IoT device or app use for a publishing a given sensor reading or actuator command to the IoT SL. The IRF can recommend that certain informational elements defined within the supportedPublishingSchema not be included (i.e. filtered) in a published sensor reading or actuator command. The schema can also include criteria information such as threshold values for including/excluding a particular informational element defined by the schema. For example, only include a particular informational element if its value exceeds a specified threshold. |
| recommendedSamplingFilter | Filter that defines the subset of attributes defined within the corresponding supportedSamplingSchema that the IRF recommends an IoT device or app to sample for a given sensor reading or actuator command. |
| recommendedEntities | A list of identifiers of IoT device(s) and/or app(s) that the IRF recommends to the targeted entity of this recommendation. An IRF can recommend that the targeted entity consider interacting with other IoT device(s) and/or app(s) instead of the current IoT device(s) and/or app(s) it is interacting with. For example, the IRF may detect that another IoT device or app may be more efficient for the targeted entity of this recommendation to interact with. For example, another IoT device or app may have a sampling or publishing time window or rate that is better aligned, a publishing or sampling filter that is better aligned, is located in a closer proximity, has more available resources (e.g. battery level is higher percentage), etc. |
| recommendedLongPollingRate | Long polling rate that IRF recommends to IoT device or app (e.g. long poll every minute) |
| recommendedLongPollingWindows | Long polling time window(s) that IRF recommends to IoT device or app (e.g. Wednesdays from 2:00 to 2:15pm) |
| recommendationStatus | A status indicating whether or not the recommendation has been accepted or not by the application entity that the recommendation is being issue to. |

Figure 16:
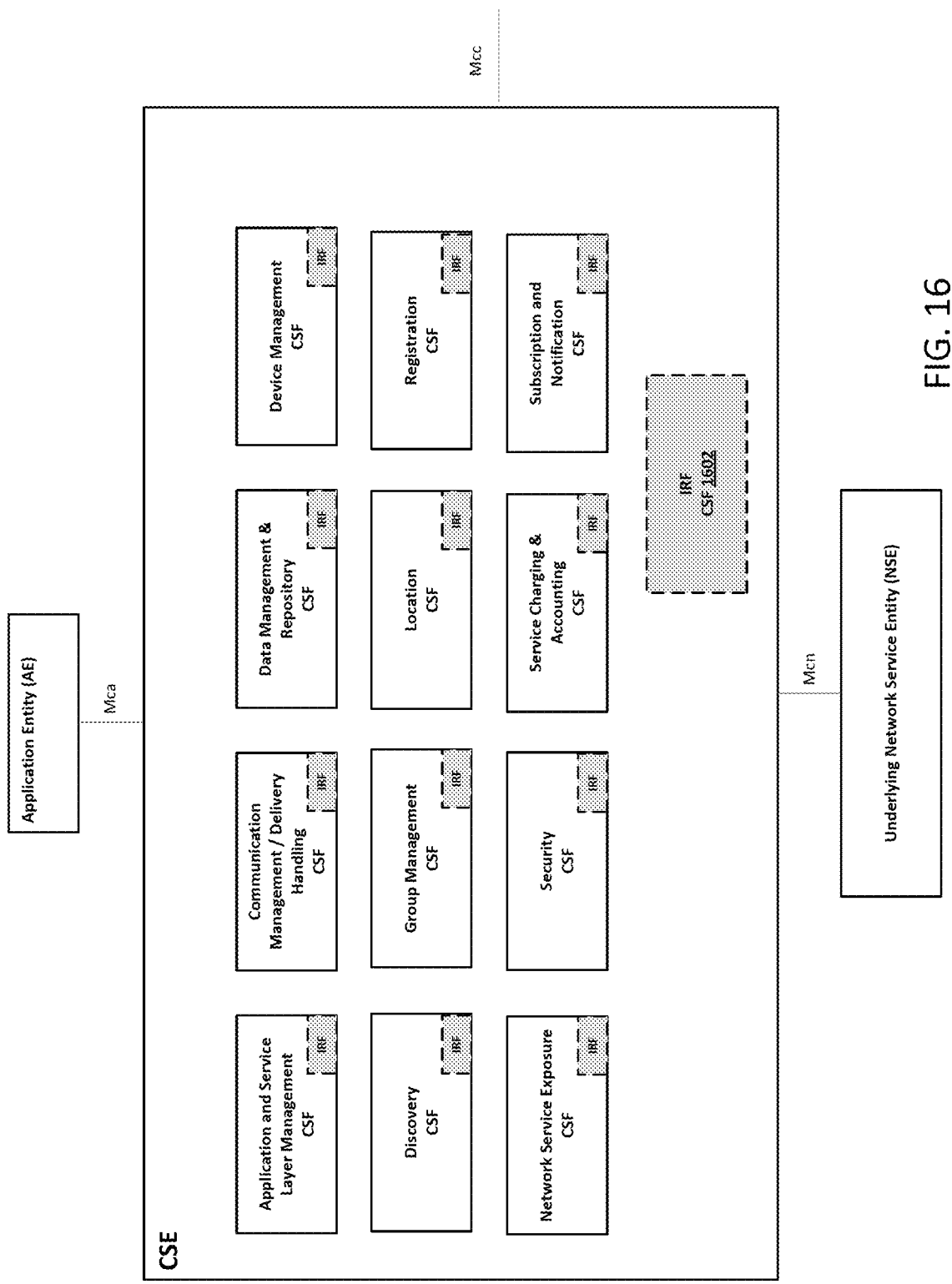
FIG. 16 is a block diagram that shows the IRF included in an oneM2M architecture in accordance with an example embodiment.

Referring to FIG. 16, within the oneM2M architecture, the IRF 801 can be as a new IRF Common Service Function (CSF) 1602 of a Common Services Entity (CSE). The CSF 1602 can be used to enable IRF support in a oneM2M system. Alternatively, IRF functionality can be realized as a capability of existing oneM2M CSFs as also shown in FIG. 16. Alternatively, referring to FIG. 17, IRF functionality can be realized as a capability of a oneM2M Interworking Proxy Entity (IPE) 1702 that interworks non-oneM2M devices 1704 to a oneM2M CSE 1706.

In some examples, the IoT devices described herein can be realized as a device that hosts a oneM2M AE and/or CSE. The IoT apps reference herein can be realized as a oneM2M AE.

In an example oneM2M embodiment, an IRF Policy can be realized as a <irfPolicy> resource. The <irfPolicy> resource can be created, updated, and deleted by an AE or CSE, or provisioned using out-of-band mechanisms such as device management. The <irfPolicy> resource can support attributes such as, but not limited to the attributes, defined in Table 1.

An <irfPolicy> resource can be a child resource of other oneM2M resources. For example, <irfPolicy> resources can be instantiated as child resources of <CSEBase>. Alternatively, <irfPolicy> resources can be instantiated as child resources of an <AE> or <remoteCSE> resources such that the applicableTarget of this policy can be the parent <AE> or <remoteCSE> resource and the applicableEntity can be the AE or CSE corresponding to the parent <AE> or <remoteCSE> resource. Alternatively, <irfPolicy> resources can be instantiated as child resources of other oneM2M resources such as but not limited to data management resources like <container> or <flexContainer> or <timeSeries>. In doing so, the applicable target of this policy can be the parent <container> or <flexContainer> or <timeSeries> resource and the applicable target can be the AE or CSE corresponding to the ancestor <AE> or <remoteCSE> resource. This can be useful for cases where recommendations are desired for a particular data stream (e.g., readings from a particular sensor or commands targeted toward a particular actuator).

In an example oneM2M embodiment, the IRF of a Registrar or Hosting CSE can issue recommendations to other oneM2M AEs or CSEs to have them change the way they interact with the Registrar or Hosting CSE. For example, the IRF may recommend that an AE or CSE increase or decrease the rate at which it publishes or samples sensor readings to/from the Registrar or Hosting CSE.

Recommendations can be issued by the IRF of a Registrar or Hosting CSE to target AEs or CSEs using various mechanisms.

In one example, a recommendation is issued via a oneM2M <recommendation> resource hosted by the Registrar or Hosting CSE or by a target CSE or AE. This resource can be created by an AE or CSE that is registered to the Registrar or Hosting CSE, for example, at the time of enrolment, registration, or sometime thereafter. An AE that creates a <recommendation> resource on the Registrar or Hosting CSE may be an administrative AE or an AE that intends to receive recommendations from the IRF of the Registrar or Hosting CSE. This resource can be updated by the Registrar or Hosting CSE with recommendations. If the <recommendation> resource is created and hosted by the Registrar or Hosting CSE, the target CSE or AE can optionally subscribe to the Registrar or Hosting CSE to receive recommendations if when the Registrar or Hosting CSE makes updates to this resource. Alternatively, a target CSE or AE can poll a <recommendation> resource hosted Registrar or Hosting CSE to receive recommendations. <recommendation> resources can be instantiated as child resource of other oneM2M resources or linked to other oneM2M resources. Doing so can define the scope and purpose of a recommendation. For example, a recommendation resource can be created as a child of Registrar or Hosting CSE resource where sensor readings for a particular sensor are stored (e.g. <container>, <flexContainer>, or <timeSeries>). Alternatively, a recommendation resource can be created as a child of Registrar or Hosting CSE resource that represents an IoT device or app (e.g. <node>, <AE>, <remoteCSE>). This may allow the Registrar or Hosting CSE to issue recommendations applicable to a specific target device, AE, or CSE.

In another example, a recommendation is embedded within a oneM2M trigger request that is issued by the Registrar or Hosting CSE and delivered to a oneM2M node hosting a target AE or CSE. This oneM2M trigger request containing the recommendation can be delivered leveraging an underlying network triggering function (e.g. a 3GPP device trigger).

In another example, a recommendation is embedded within a device management request that is issued by the Registrar or Hosting CSE and delivered to a oneM2M node hosting a target AE or CSE via an underlying device management framework. For example, a recommendation can be embedded within a new software image that is downloaded and installed onto a device or included in a device configuration request to change the settings of a device. A recommendation via a device management request can be made via a oneM2M device management resource. A oneM2M device management resource can be hosted by the Registrar or Hosting CSE or by a target CSE or AE. This resource can be created by an AE or CSE that is registered to the Registrar or Hosting CSE. For example, at the time of enrolment, registration or sometime thereafter. An AE that creates a device management resource on the Registrar or Hosting CSE may be an administrative AE or an AE that intends to receive recommendations from the IRF of the Registrar or Hosting CSE. This resource can be updated by the Registrar or Hosting CSE with recommendations. If the device management resource is created and hosted by the Registrar or Hosting CSE, the target CSE or AE can optionally subscribe to the Registrar or Hosting CSE to receive recommendations if when the Registrar or Hosting CSE makes updates to this resource. Alternatively, a target CSE or AE can poll a device management resource hosted Registrar or Hosting CSE to receive recommendations.

In yet another example, the IRF of a Registrar or Hosting CSE can issue a recommendation to a target AE or CSE via the autonomous configuration and management of one or more of the following oneM2M resources and attributes. It is recognized herein that currently oneM2M does not define functionality within a Registrar or Hosting CSE to autonomously configure and manage these resources. Rather, these resources are configured by an AE in an application specific manner. Enabling a Registrar or Hosting CSE with an IRF to configure and manage these resources based on the observed interest of AEs and CSEs interacting within one another, may allow the Registrar or Hosting CSE to offload this responsibility and burden from these AEs and CSEs. An AE or CSE can subscribe to these resources or attributes to receive notifications if/when a Registrar or Hosting CSE updates the resource or attribute with a recommendation (e.g. modifications to reporting or sampling schedule, rate or filter). As a result, an AE or CSE may be sent a notification by the Registrar or Hosting CSE containing the recommendation. The AE or CSE can use this information to make adjustments (e.g., adjustments to time windows, rate, data filters, etc.) in the requests it sends to a Registrar or Hosting CSE to publish or sample data. For example:

<schedule> resource
[dataCollection] resource
activityPatternElements attribute In another example, a new oneM2M recommendation request primitive can be defined that the Registrar or Hosting CSE can use to issue recommendations to a target CSE or AE. For example, new request and response primitives can correspond to a new oneM2M <recommendation> resource or new oneM2M management object resources.

In some cases, one or more new oneM2M recommendation request or response parameters can be defined that the Registrar or Hosting CSE can use to issue recommendations to a target CSE or AE. For example, a parameter in a response can be included to recommend an adjustment to the rate at which an AE or CSE issues polling channel (e.g., long polling) requests to the Registrar or Hosting CSE.

Figure 17:
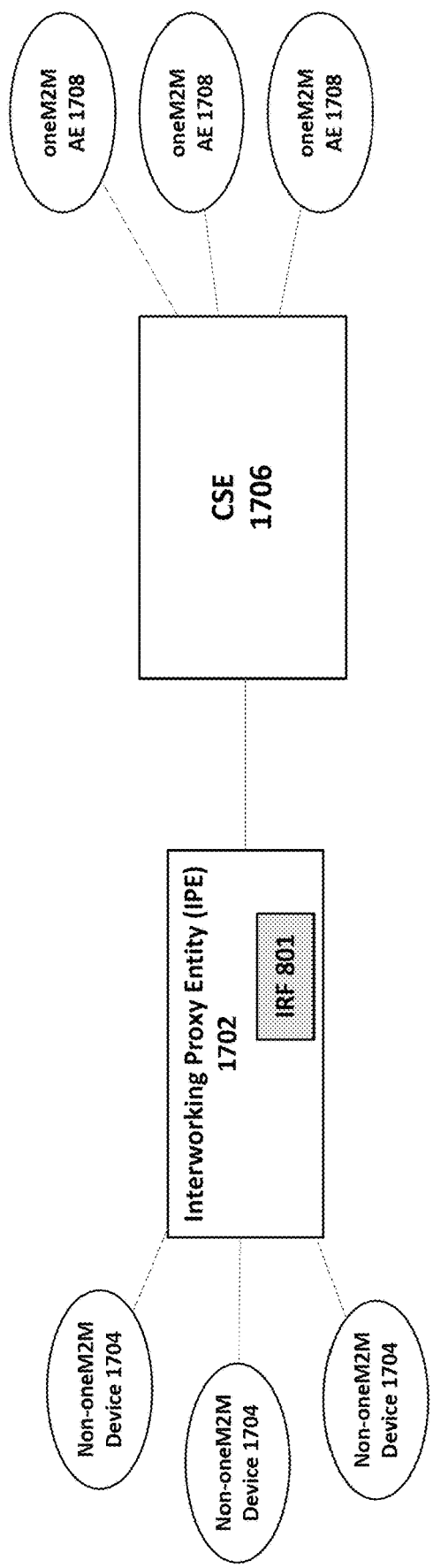
FIG. 17 is a block diagram that shows an example oneM2M embodiment that includes the IRF and an Interworking Proxy Entity (IPE).

As shown in FIG. 17, recommendations can also be issued by the IRF 801 of an IPE 1702 to target non-oneM2M devices 1704 that are publishing sensor readings or consuming commands. The IPE 1702 can interact with the non-oneM2M devices 1704 and interwork them to a CSE 1706, such that oneM2M AEs 1708 can sample sensor readings or send commands to the non-oneM2M devices 1704. The IRF 801 of the IPE 1702 can in turn send recommendations to non-oneM2M devices 1704 using native methods supported by the non-oneM2M technology.

For example, an IRF of an IPE can collect the interest of oneM2M AEs in one or more non-oneM2M devices. The IRF can do this in one or several different ways such as monitoring the subscriptions or other types of requests such as retrieves or updates made to the CSE by oneM2M AEs to oneM2M resources that represent the non-oneM2M devices. Based on this monitoring, the IPE can detect the interest of oneM2M AEs in interacting with the non-oneM2M devices. The IRF can assess this interest of oneM2M AEs via detecting the rate of their requests, which specific resource attributes they are requesting or subscribing to, which specific range or threshold of values they are interested in, etc. Using this interest information, the IRF can make recommendations to the non-oneM2M devices. These recommendations can be made using methods that are native to the non-oneM2M devices. For example, recommendations can be made by adjusting CoAP Observe criteria or LWM2M management object resources for non-oneM2M devices which are CoAP-based or LWM2M-based. A oneM2M recommendation can include attributes, for example and without limitation, such as those listed in Table 3

Figure 18:
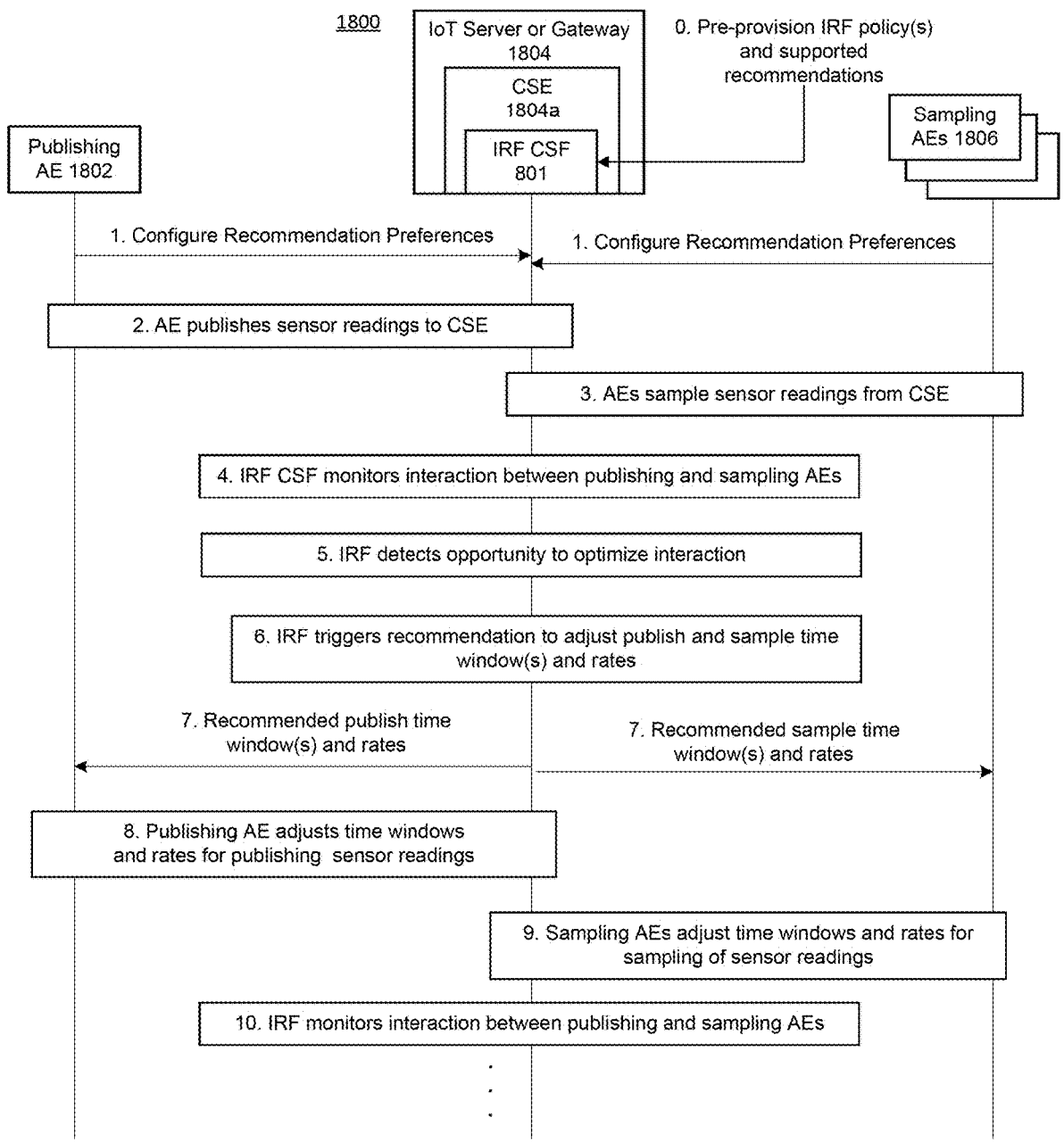
FIG. 18 is a call flow in which common service entity's (CSE's) IRF common service function (CSF) recommends a change to a oneM2M application entity (AE) publishing and sampling rates, in accordance with an example embodiment.

Referring now to FIG. 18, an example oneM2M use case is shown in accordance with an example embodiment. FIG. 18 shows an example system 1800 that includes a publishing AE 1802, an IoT server or gateway 1804 hosting a CSE 1804a that supports an IRF CSF 801, and sampling AEs 1806. It will be appreciated that the example system 1800 is simplified to facilitate description of the disclosed subject matter and is not intended to limit the scope of this disclosure. Other devices, systems, and configurations may be used to implement the embodiments disclosed herein in addition to, or instead of, a system such as the system illustrated in FIG. 18, and all such embodiments are contemplated as within the scope of the present disclosure.

In this example, the IRF 801 is configured with IRF policies that define rules that the IRF uses to detect non-optimal interaction between an AE 1802 that publishes sensor readings to the CSE 1804a and one or more AEs 1806 that sample these sensor readings from the CSE 1804a. The IRF 801 monitors the publish and sample requests that the AEs make to the CSE 1804a. The IRF 801 may detect that there is a mismatch in the time windows and/or rate that sensor readings are published to the CSE 1804a by the publishing AE 1802 compared to the time windows and/or rate that the sensor readings are sampled by the one or more sampling AEs 1806. The IRF 801 then sends recommendation(s) directly to the AEs to adjust their publishing and sampling windows and/or rates such that they are aligned with one another. Alternatively, an IRF can send recommendations indirectly to the AEs via an intermediary function such as a device management server, an underlying network triggering function, etc.

At 0, the IRF 801 may be configured with <irfPolicy> resources containing rules that provide guidance to the IRF CSF 801 for the optimization of interaction between publishing and sampling AEs. For example, this information can be hard coded into the IRF 801 by a developer at the time of development, pre-provisioned into the IRF 801 at the time of deployment, or configured using out-of-band mechanisms by a service provider that owns and operates an IRF within its service platform. Some examples of out-of-band mechanisms can include a management portal which exposes a GUI that can be used by a service provider to configure and manage its platform or a device management server which the service provider uses to push this information to the IRF. IRF policies can include information such as, but not limited to, the example attributes defined in Table 1.

At 1, individual AEs can send requests to configure the IRF of a Registrar or Hosting CSE with <irfPolicy>, <recommendation> and device management resources that convey their supported recommendation preferences and method of receiving recommendations from the IRF. For example, an AE can send a request to create an <irfPolicy> resource that can include information such as but not limited to the attributes defined in Table 1. For example, an AE can send a request to create an <irfPolicy> resource with the following information, presented by way of example and without limitation:

IRF ID—an identity of an IRF that this policy is applicable to for cases where multiple IRFs are deployed.

enable—set to TRUE or FALSE to enable or disable the policy. An AE can dynamically change this value during times when it does and does not want to receive recommendations.

policyType—the type of IRF policy and in turn the type of recommendations that this policy is applicable to. For example, this attribute may be an enumerated value configured to RATE_CONTROL to indicate that the AE wants to receive recommendations to adjust its rate of publishing or sampling.

applicableTargets—a list of resource identifiers of the resources that this IRF policy is applicable to. For example one or more <container>, <flexContainer> or <timeSeries> resources. An IRF may then monitor and collect context related to requests targeted towards these resources.

applicableEntities—a list of identifiers of one or more AEs or CSEs that this IRF policy is applicable to and that the IRF can issue recommendations to. An IRF can monitor and collect context related to the requests issued from these entities and that are targeted towards applicable targets defined by this policy. Based on this context and the policies and recommendations defined by this policy, the IRF can make recommendations to these entities.

maxSupportedPublishingRates—the maximum supported publishing rate of the applicable AEs or CSEs (e.g., 15<contentInstance> creates per minute) to the applicable targets.

minSupportedPublishingRates—the IRF the minimum supported publishing rate of the applicable AEs or CSEs (e.g., 1<contentInstance> create per minute) to the applicable targets.

maxSupportedSamplingRates—the maximum supported sampling rate of the applicable AEs or CSEs (e.g. 15<container>/latest retrievals per minute) to the applicable targets.

minSupportedSamplingRates—the minimum supported sampling rate of the applicable AEs or CSEs (e.g. 1<container>/latest retrieval per minute) to the applicable targets.

maxSupportedLongPollingRate—the maximum supported polling channel rate of the applicable AEs or CSEs (e.g. poll once a second)

minSupportedLongPollingRate—the minimum supported polling channel rate of the applicable AEs or CSEs (e.g. poll once a minute)

supportedPublishingWindows—the schedule time windows when applicable AEs or CSEs support publishing data (e.g. via <container>, <flexContainer> or <timeSeries> resources)

supportedSamplingWindows—the schedule time windows when applicable AEs or CSEs support sampling data (e.g. via <container>, <flexContainer> or <timeSeries> resources)

supportLongPollingWindows—the schedule time windows when applicable AEs or CSEs support polling for requests from CSE supportedPublishingSchema—configured with a resource schema or identifier (e.g. URI or URN) of a schema that an AE or CSE supports for publishing data to a CSE. For example, a schema for a <flexContainer> resource or a schema for the data stored in the content attribute of a <contentInstance> resource. This schema may also be used to specify a subset of attributes of a resource that an AE or CSE is interested in receiving recommendations for rather than an entire schema of the complete resource.

supportedSamplingSchema—configured with a resource schema or identifier (e.g. URI or URN) of a schema that an AE or CSE supports for sampling data to a CSE. For example, a schema for a <flexContainer> resource or a schema for the data stored in the content attribute of a <contentInstance> resource. This schema may also be used to specify a subset of attributes of a resource that an AE or CSE is interested in receiving recommendations for rather than an entire schema of the complete resource.

triggerCriteria—configured with the conditions that must be met for the IRF to send a recommendation. For example and without limitation, this attribute may include:

A publishing and sampling time window mismatch that exceeds a certain threshold defined by the criteria. For example, a threshold given as a percentage (e.g., less than 20% overlap) or a value (e.g., less than 1 minute of overlap).

A publishing and sampling rate mismatch that exceeds a certain threshold defined by the criteria. For example, a threshold given as a percentage (e.g., more than 50% difference in rates).

The detected occurrence of one or more informational elements that are published but that are not sampled or not sampled within a certain time duration defined by the criteria. For example, information published and never sampled or published but not sampled within 24 hours.

Recommendations—a list of one or more recommendations that the IRF is to make to the applicable AEs or CSEs if/when the trigger criteria for this policy have been met. For example, this attribute may be an enumerated value configured to ADJUST PUBLISHING TIME WINDOW to indicate that the IRF is to adjust the publishing time window of the applicable AEs or CSEs to align with the sampling windows that the IRF detects on the targeted resources.

recommendationMethod—specifies the method for how the IRF is to issue the recommendation. For example, this attribute may be an enumerated value configured to RECOMMENDATION RESOURCE.

recommendationResource—Depending on the recommendation method can be configured with a reference to a resource which the IRF updates with recommendation information. For example, this attribute can be configured with a URI of a <recommendation> resource.

recommendationACPs—Can be configured with one or more identifiers of access control policy resources that the IRF inspects to determine whether or not it is allowed to issue recommendations to the applicable AEs or CSEs.

Still referring to FIG. 18, in accordance with the illustrated example, at 2, the AE 1802 publishes sensor readings to the CSE 1804a. This can be done in a periodic manner (e.g., once and an hour) or in an event based manner (e.g. when detecting a sensor measurement exceeds a certain threshold). At 3, one or more AEs 1806 sample sensor readings from the CSE 1804a which were published by the publishing AE 1802. This can be done in a polling manner (e.g., by sending a request to the CSE to retrieve a sensor reading). Alternatively, this can be done in a subscription based manner. In a subscription based manner, the AE 1806 can subscribe to the CSE 1804a to receive a notification containing a sensor reading when it is published. This subscription can include criteria that define when the AE 1806 wishes to receive a published sensor reading. For example, the criteria can specify that the sampling AE 1806 wants to receive all published sensor readings or a subset based on a specified criteria such as if/when the value of the sensor reading crosses a specified threshold or the presence or lack thereof of specific informational elements in a sensor reading. As an example, a given AE 1806 can create a oneM2M <subscription> as a child resource of a <flexContainer> resource. This <flexContainer> can have multiple custom attributes defined such as customAttr1 and customAttr2. The <subscription> resource created by the AE can define eventNotificationCriteria that specify whether the AE wants a notification if/when any of the <flexContainer> resource attributes are modified or if/when particular attribute(s) such as customAttr1 and/or customAttr2 are modified. Based on the specified eventNotificationCriteria, the IRF can assess the interest of the AE on the entire <flexContainer> resource and all of its attributes or an interest only in specific attributes of the <flexContainer> resource.

At 4, in accordance with the illustrated example, the IRF 801 collects context information such as, for example and without limitation, the attributes defined in Table 2. For example, context information may indicate the scheduled windows of time that the publishing AE 1802 publishes sensor readings to the CSE 1804a, the scheduled windows of time that the sampling AEs 1806 sample sensor readings from the CSE 1804a, the rates that the publishing and sampling AEs 1802 and 1806 publish or sample sensor readings to or from the CSE 1804a during these time windows, the types of subscriptions created by publishing and sampling AEs 1802 and 1806 to CSE resources of interest, and the notification criteria of each subscription.

At 5, the IRF 801 analyzes the IRF context and compares it against IRF trigger criteria defined within IRF policies that have been configured into the IRF 801. The IRF trigger criteria can include attributes such as, but not limited to, those defined in Table 1. For example, a trigger criteria may be if there is a mismatch (e.g., difference) in the time windows or the rate in which a publishing AE publishes sensor readings to the CSE as compared to the time windows or the rate of the one or more sampling AEs that sample the published sensor readings from the CSE. In some cases in which more than one sampling AE 1806 samples published sensor readings originating from the same publishing AE 1802, the IRF 801 can aggregate these sampling time windows and/or sampling rates together. The IRF 801 can then evaluate the aggregated sampling time windows and/or aggregated sampling rates of the sampling AEs 1806 against the publishing time windows and/or publishing rate of the publishing AE 1802.

At 6, based on the trigger criteria and collected context, the IRF 801 evaluates whether any IRF trigger criteria have been met to issue recommendations to the applicable publishing AE and/or sampling AEs. For example, recommendations may be issued if the publishing and sampling time windows are offset from each other by more than a specified time duration, or if the publishing and sampling rates differ by more than a specified factor.

At 7, in accordance with the illustrated example, if/when an IRF trigger criterion has been met, the IRF can generate recommendation(s) to the applicable AE based on recommendations defined within an IRF policy. For example, recommendations may be to adjust the publishing time window or adjust the publishing rate, which can be specified by an IRF policy. The IRF 801 can issue recommendations to the one or more applicable AEs defined within the IRF policy using one or more of the methods defined herein. For example, the IRF 801 can issue a recommendation by updating recommendation resource(s) that correspond with each of the applicable AEs. This update can be made to a recommendation resource that is hosted on the AE itself, or one that is hosted by the CSE and which the AE samples or subscribes to. The update can result in the modification to one or more attributes of the recommendation resource such as, but not limited to, the applicable attributes defined in Table 3. For example, the IRF 801 can update the publishing AEs 1802 recommended publishing windows and/or its recommended publishing rate. In some cases, the IRF 801 can also interact with an intermediary function such as a device management server or an underlying network triggering function to send recommendations indirectly to the AEs. Further, the IRF 801 can interact with an underlying network before/after issuing a recommendation to the AE(s). In doing so, the IRF 801 can align the recommendations it issues to AE(s) with the configuration of the underlying network that is used for underlying communication between the AEs. For example, the IRF 801 can issue requests to the underlying cellular network to configure network resources and the sleep timers of one or more cellular devices hosting AE(s) such that they are aligned with the time windows and rate of requests exchanged between them.

At 8, upon receiving the recommendation from the IRF 801, the publishing AE 1802 may process the recommendation and decides whether to accept or ignore the recommendation. For example, the AE 1802 may decide whether or not to change its publishing time window and/or publishing rate. The decision whether to accept or reject the recommendation may be based on deployment or platform specific requirements. The publishing AE 1802 may update the recommendationStatus accordingly.

At 9, upon receiving the recommendation from the IRF 801, the sampling AEs 1806 process the recommendation and decide whether to accept or ignore the recommendation. For example, the AEs 1806 whether or not to change their sampling time window and/or sampling rate. The decision whether to accept or reject the recommendation may be based on deployment or platform specific requirements. The sampling AE 1806 may update the recommendationStatus accordingly.

At 10, after issuing the recommendation(s) to the respective AEs, the IRF 801 continues to monitor SL requests issued by the AEs and monitor for adjustments to the time windows and rates of their requests to publish and sample to/from the CSE. While monitoring, the IRF 801 continues to collect and assess IRF context against IRF policies to determine if/when to make further recommendations as described above with reference to steps 4-10.

Referring to FIG. 19, an example IRF user interface 1900 may be implemented to assist a user with the configuration of the IRF Policies, and to receive recommendations issued by the IRF 801. The user interface 1900 can allow a user to enable/disable recommendations, select a type of policy, configure applicable targets, configure applicable entities, configure recommendation limits, configure IRF Trigger Criteria, configure a type of recommendation, and the like.

Figure 20A:
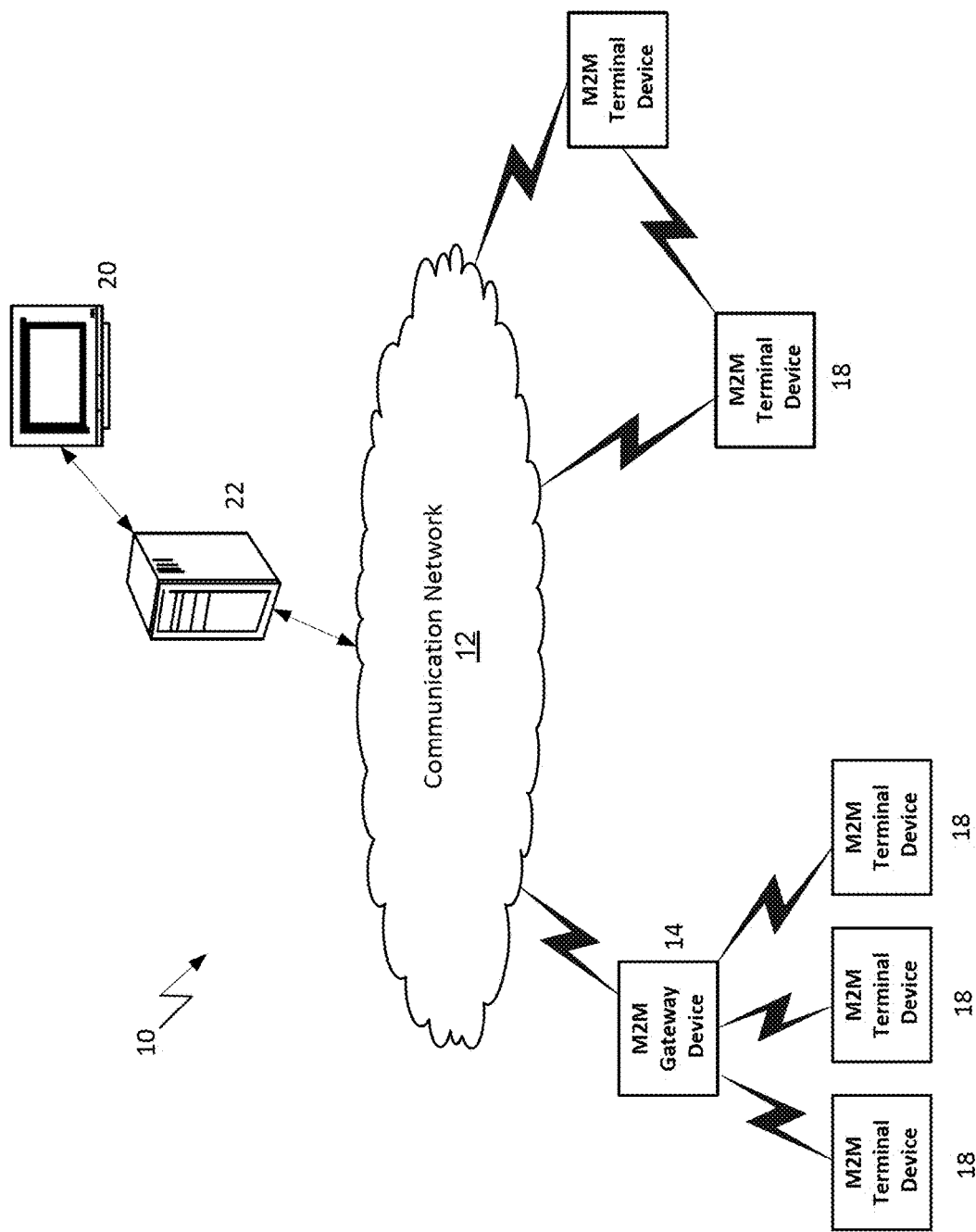
FIG. 20A is a system diagram of an example machine-to-machine (M2M), Internet of Things (IoT), or Web of Things (WoT) communication system in which one or more disclosed embodiments may be implemented.

FIG. 20A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT Service Layer, etc. Any of the client, proxy, or server devices illustrated in any of FIGS. 8, 9, 11, 16, and 17 may comprise a node of a communication system, such as the ones illustrated in FIGS. 2, 3, 8, 20A and 20B.

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

Figure 20B:
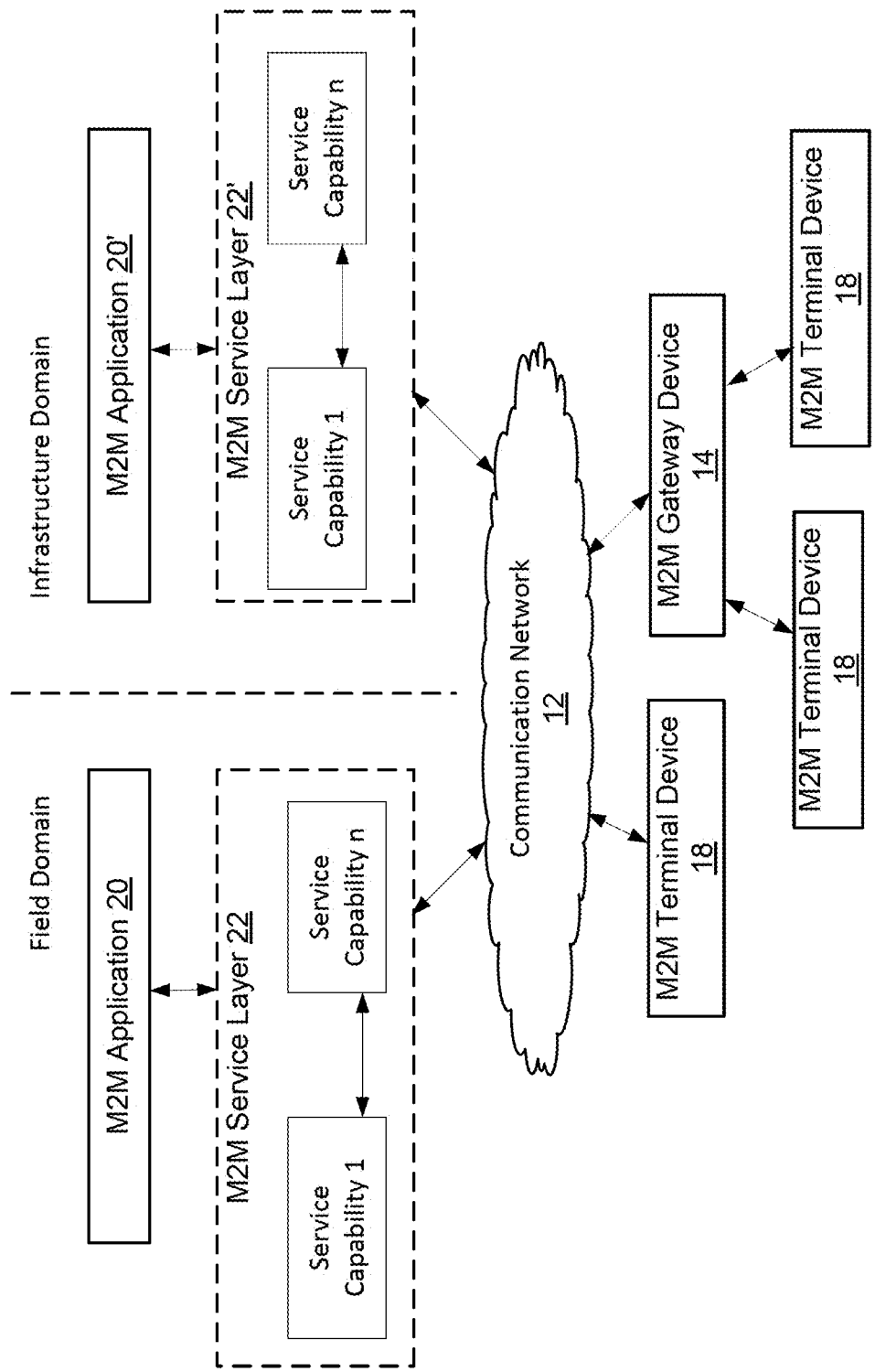
FIG. 20B is a system diagram of an example architecture that may be used within the M2M/IoT/WoT communications system illustrated in FIG. 1.

As shown in FIG. 20B0A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 20B0A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different nodes (e.g., servers, gateways, device, and the like) of the network. For example, the Field Domain may include M2M gateways 14 and devices 18. It will be appreciated that any number of M2M gateway devices 14 and M2M devices 18 may be included in the M2M/IoT/WoT communication system 10 as desired. Each of the M2M gateway devices 14 and M2M devices 18 are configured to transmit and receive signals, using communications circuitry, via the communication network 12 or direct radio link. A M2M gateway 14 allows wireless M2M devices (e.g., cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or other M2M devices 18. The M2M devices 18 may also receive data from the M2M application 20 or an M2M device 18. Further, data and signals may be sent to and received from the M2M application 20 via an M2M Service Layer 22, as described below. M2M devices 18 and gateways 14 may communicate via various networks including, cellular, WLAN, WPAN (e.g., Zigbee, 6LoWPAN, Bluetooth), direct radio link, and wireline for example. Exemplary M2M devices include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Referring to FIG. 20B, the illustrated M2M Service Layer 22 in the field domain provides services for the M2M application 20, M2M gateways 14, and M2M devices 18 and the communication network 12. It will be understood that the M2M Service Layer 22 may communicate with any number of M2M applications, M2M gateways 14, M2M devices 18, and communication networks 12 as desired. The M2M Service Layer 22 may be implemented by one or more nodes of the network, which may comprise servers, computers, devices, or the like. The M2M Service Layer 22 provides service capabilities that apply to M2M devices 18, M2M gateways 14, and M2M applications 20. The functions of the M2M Service Layer 22 may be implemented in a variety of ways, for example as a web server, in the cellular core network, in the cloud, etc.

Similar to the illustrated M2M Service Layer 22, there is the M2M Service Layer 22' in the Infrastructure Domain. M2M Service Layer 22' provides services for the M2M application 20' and the underlying communication network 12 in the infrastructure domain. M2M Service Layer 22' also provides services for the M2M gateways 14 and M2M devices 18 in the field domain. It will be understood that the M2M Service Layer 22' may communicate with any number of M2M applications, M2M gateways and M2M devices. The M2M Service Layer 22' may interact with a Service Layer by a different service provider. The M2M Service Layer 22' may be implemented by one or more nodes of the network, which may comprise servers, computers, devices, virtual machines (e.g., cloud computing/storage farms, etc.) or the like.

Referring also to FIG. 20B, the M2M Service Layers 22 and 22' provide a core set of service delivery capabilities that diverse applications and verticals may leverage. These service capabilities enable M2M applications 20 and 20' to interact with devices and perform functions such as data collection, data analysis, device management, security, billing, service/device discovery, etc. Essentially, these service capabilities free the applications of the burden of implementing these functionalities, thus simplifying application development and reducing cost and time to market. The Service Layers 22 and 22' also enable M2M applications 20 and 20' to communicate through various networks such as network 12 in connection with the services that the Service Layers 22 and 22' provide.

The M2M applications 20 and 20' may include applications in various industries such as, without limitation, transportation, health and wellness, connected home, energy management, asset tracking, and security and surveillance. As mentioned above, the M2M Service Layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, a Service Layer, such as the Service Layers 22 and 22' illustrated in FIG. 20B, defines a software middleware layer that supports value-added service capabilities through a set of Application Programming Interfaces (APIs) and underlying networking interfaces. Both the ETSI M2M and oneM2M architectures define a Service Layer. ETSI M2M's Service Layer is referred to as the Service Capability Layer (SCL). The SCL may be implemented in a variety of different nodes of the ETSI M2M architecture. For example, an instance of the Service Layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M Service Layer supports a set of Common Service Functions (CSFs) (i.e., service capabilities). An instantiation of a set of one or more particular types of CSFs is referred to as a Common Services Entity (CSE) which may be hosted on different types of network nodes (e.g., infrastructure node, middle node, application-specific node). The Third Generation Partnership Project (3GPP) has also defined an architecture for machine-type communications (MTC). In that architecture, the Service Layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the Service Layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a Service Layer or component thereof may be implemented in the form of software running on a network node (e.g., server, computer, gateway, device or the like) having the general architecture illustrated in FIG. 20C or FIG. 20D described below.

Further, the methods and functionalities described herein may be implemented as part of an M2M network that uses a Service Oriented Architecture (SOA) and/or a Resource-Oriented Architecture (ROA) to access services.

Figure 20C:
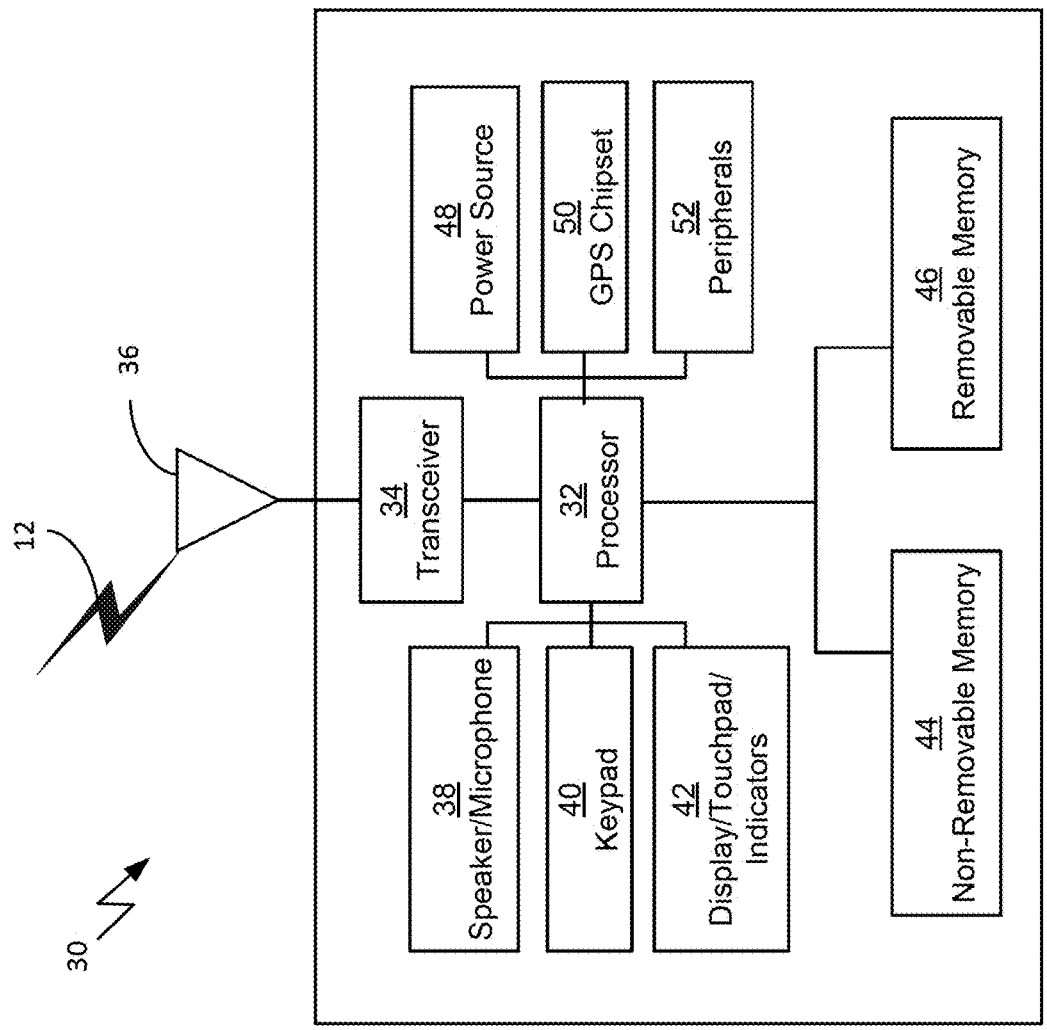
FIG. 20C is a system diagram of an example communication network node, such as an M2M/IoT/WoT device, gateway, or server that may be used within the communications system illustrated in FIGS. 20A and 20B.

FIG. 20C is a block diagram of an example hardware/software architecture of a node of a network, such as one of the clients, servers, or proxies illustrated in FIGS. 8, 9, 11, 16, and 17, which may operate as an M2M server, gateway, device, or other node in an M2M network such as that illustrated in FIGS. 2, 3, 8, 20A, and 20B. As shown in FIG. 20C, the node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the node 30 may include any sub-combination of the foregoing elements while remaining consistent with an embodiment. This node may be a node that implements the recommendation functions, e.g., in relation to the methods described in reference to FIGS. 10, 12-15, and 18, the data structures described herein, Tables 1-3, or in a claim.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 20C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the recommendation functions herein, e.g., in relation to FIGS. 10, 12-15, and 18, or in a claim. While FIG. 20C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 20C as a single element, the node 30 may include any number of transmit/receive elements 36. More specifically, the node 30 may employ MIMO technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer. The processor 32 may be configured to control lighting patterns, images, or colors on the display or indicators 42.

The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. It will be appreciated that the node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., finger print) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52.

Figure 20D:
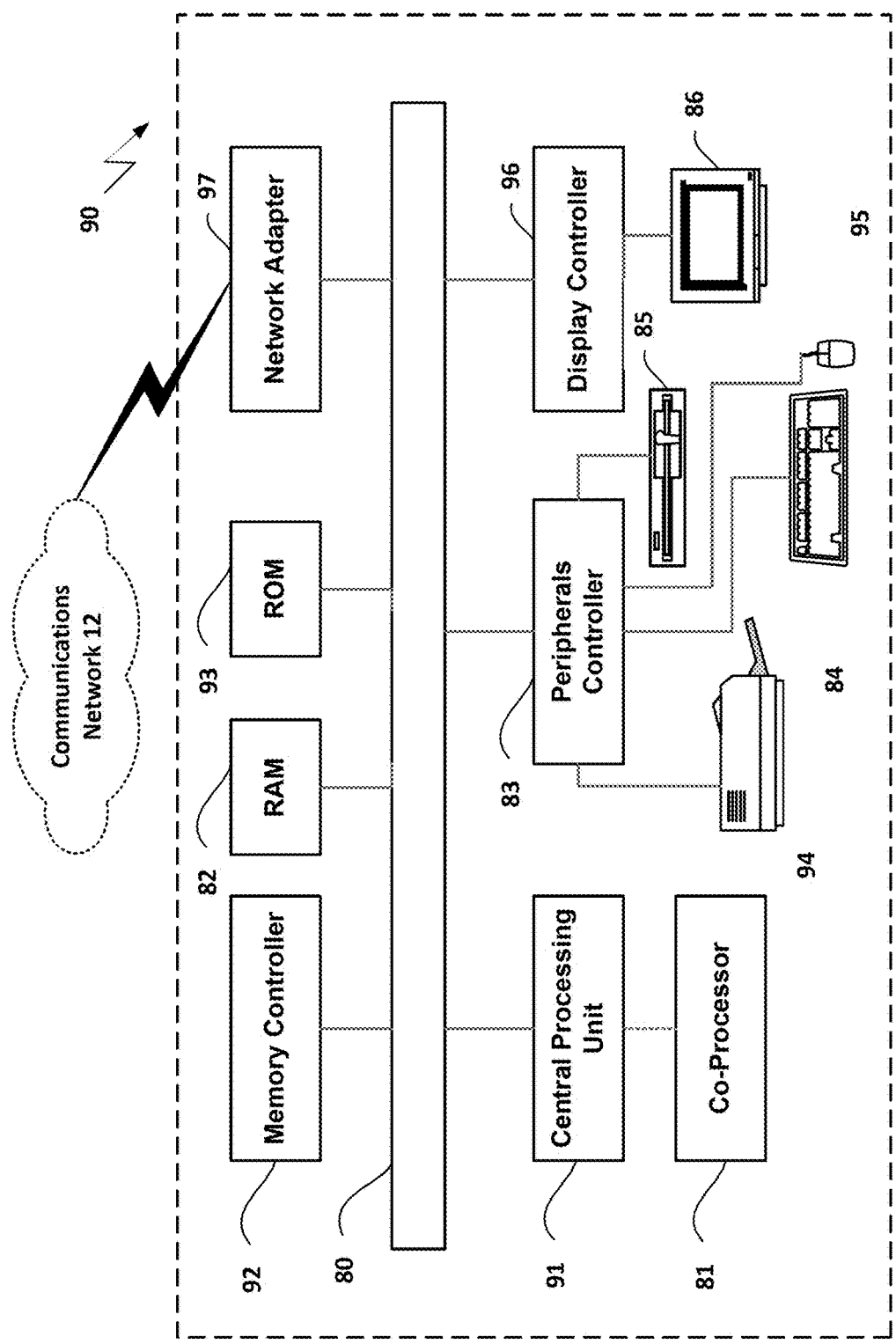
FIG. 20D is a block diagram of an example computing system in which a node of the communication system of FIGS. 20A and 20B may be embodied.

FIG. 20D is a block diagram of an exemplary computing system 90 which may also be used to implement one or more nodes of a network, such as the clients, servers, or proxies illustrated in FIGS. 8, 9, 11, 16, and 17, which may operate as an M2M server, gateway, device, or other node in an M2M network such as that illustrated in FIGS. 2, 3, 8, 20A, and 20B.

Computing system 90 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M Service Layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIGS. 1-4, to enable the computing system 90 to communicate with other nodes of the network.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

The following is a list of acronyms relating to service level technologies that may appear in the above description. Unless otherwise specified, the acronyms used herein refer to the corresponding term listed below.

ADN Application Dedicated Node
AE Application Entity
API Application Programming Interface
ASN Application Service Node
CSE Common Service Entity
CSF Common Service Function
IN Infrastructure Node
IoT Internet of Things
IRF Interest-based Recommendation Function
M2M Machine-to-Machine
REST Resource State Transfer
SL Service Layer
URI Uniform Resource Identifier This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. An apparatus comprising a processor, a memory, and communication circuitry, the apparatus being connected to a network via its communication circuitry, the apparatus further comprising computer-executable instructions stored in the memory of the apparatus which, when executed by the processor of the apparatus, cause the apparatus to perform operations comprising:
monitoring interactions between an IoT device and an IoT application, wherein the IoT device comprises a sensor having readings, the IoT device publishes the sensor readings to a service layer hosted on the apparatus, and the IoT application samples the published readings from the service layer hosted on the apparatus;
based on the monitoring, identifying an interaction between the IoT device and an IoT application that can be adjusted, wherein the interaction comprises a mismatch between a rate of the sensor readings published by the IoT device to the service layer hosted on the apparatus and a rate of the sensor readings sampled by the IoT application from the service layer hosted on the apparatus;
generating a first instruction in response to identifying the interaction, the first instruction indicating a change in behavior for one of the IoT device or the IoT application; and
issuing the first instruction to the one of the IoT device or the IoT application, so as to cause the one of the IoT device or the IoT application to change the respective behavior, thereby aligning the rate of the sensor readings published by the IoT device to the service layer hosted on the apparatus with the rate of the sensor readings sampled by the IoT application from the service layer hosted on the apparatus.

2. The apparatus as recited in claim 1, wherein the computer-executable instructions cause the apparatus to perform further operations comprising:
generating a second instruction in response to identifying the interaction, the second instruction indicating a change in behavior for the other one of the IoT device or the IoT application; and
issuing the second instruction to the other one of the IoT device or the IoT application, thereby adjusting the interaction between the IoT device and the IoT application.

3. The apparatus as recited in claim 1, wherein identifying the interaction between the IoT device and the IoT application that can be adjusted comprises determining that a rate at which one of the IoT device or the IoT application publishes data to the apparatus is different as compared to a rate at which the other one of the IoT device or the IoT application samples the data from the apparatus.

4. The apparatus as recited in claim 1, wherein identifying the interaction between the IoT device and an IoT application that can be adjusted comprises determining that a time window during which the IoT device publishes data to the service layer hosted on the apparatus is different as compared to a time window during which the IoT application samples the data from the service layer hosted on the apparatus.

5. The apparatus as recited in claim 1, wherein the first instructions indicates a change in the rate at which the IoT device publishes the readings.

6. The apparatus as recited in claim 1 wherein the first instructions indicates a change in the rate at which the IoT application samples the readings.

7. The apparatus as recited in claim 1, wherein the computer-executable instructions cause the apparatus to perform further operations comprising:
receiving one or more recommendation preferences from the IoT device or the IoT application; and
generating and issuing the first instruction based on the one more recommendation preferences.

8. An apparatus comprising a processor, a memory, and communication circuitry, the apparatus being connected to a network via its communication circuitry, the apparatus further comprising computer-executable instructions stored in the memory of the apparatus which, when executed by the processor of the apparatus, cause the apparatus to perform operations comprising:
monitoring interactions between an IoT device and a plurality of IoT applications, wherein the IoT device comprises a sensor having readings, the IoT device publishes the sensor readings to a service layer hosted on the apparatus, and a subset of the IoT applications of the plurality of IoT applications samples the published readings from the service layer hosted on the apparatus;
based on the monitoring, identifying an interaction between the IoT device and the plurality of IoT applications that can be adjusted;
generating instructions in response to identifying the interaction, the instructions indicating a change in behavior for the subset of the IoT applications; and
issuing the respective instructions to the subset of the IoT applications, so as to cause each of the subset of IoT applications to change their respective behavior, thereby aligning the rate of the sensor readings published by the IoT device to the service layer hosted on the apparatus with the rate of the sensor readings sampled by the subset of the plurality of IoT applications from the service layer hosted on the apparatus.

9. The apparatus as recited in claim 8, wherein identifying the interaction between the IoT device and the plurality of IoT applications that can be adjusted comprises determining that the subset of IoT applications publish commands toward the IoT device during respective publishing time windows and at respective publishing rates.

10. The apparatus as recited in claim 9, wherein the instructions indicate a change in the respective publishing rate at which the subset of IoT applications publish commands toward the IoT device, or a change in the respective publishing time window during which the subset of IoT applications publish commands.

11. The apparatus as recited in claim 8, wherein identifying the interaction between the IoT device and the plurality of IoT applications that can be adjusted further comprises determining that the respective time windows are not aligned with each other, or determining that the respective publishing rates exceed a specified threshold associated with a maximum sampling rate of the IoT device.

12. The apparatus as recited in claim 8, wherein the computer-executable instructions cause the apparatus to perform further operations comprising:

receiving one or more recommendation preferences from the IoT device or the IoT applications; and generating and issuing the instructions based on the one more recommendation preferences.

13. An apparatus comprising a processor, a memory, and communication circuitry, the apparatus being connected to a network via its communication circuitry, the apparatus further comprising computer-executable instructions stored in the memory of the apparatus which, when executed by the processor of the apparatus, cause the apparatus to perform operations comprising:

monitoring a first IoT device, a second IoT device, and an IoT application, wherein the first IoT device comprises a sensor having readings, the first IoT device publishes the sensor readings to a service layer hosted on the apparatus, and the IoT application samples the published readings from the service layer hosted on the apparatus;

based on the monitoring, determining that the second IoT device is better for interacting with the IoT application as compared to the first IoT device, wherein an interaction comprises a mismatch between a rate of the sensor readings published by the first IoT device to the service layer hosted on the apparatus and a rate of the sensor readings sampled by the IoT application from the service layer hosted on the apparatus;

generating instructions that indicate a change in the interaction between the IoT application and the first IoT device;

issuing the instructions to the IoT application, so as to cause the IoT application to interact with the second IoT device instead of the first IoT device, thereby ending the interaction between the first IoT device and the IoT application.

14. The apparatus as recited in claim 13, wherein the instructions cause the IoT application to sample data from the second IoT device instead of the first IoT device.

15. The apparatus as recited in claim 13, wherein the computer-executable instructions cause the apparatus to perform further operations comprising:

receiving one or more recommendation preferences from the first IoT device, the second IoT device, or the IoT application; and generating and issuing the instructions based on the one more recommendation preferences.

16. A method comprising:

monitoring interactions between an IoT device and an IoT application, wherein the IoT device comprises a sensor having readings, the IoT device publishes the sensor readings to a service layer hosted on the apparatus, and the IoT application samples the published readings from the service layer hosted on the apparatus;

based on the monitoring, identifying an interaction between the IoT device and an IoT application that can be adjusted, wherein the interaction comprises a mismatch between a rate of the sensor readings published by the IoT device to the service layer hosted on the apparatus and a rate of the sensor readings sampled by the IoT application from the service layer hosted on the apparatus;

generating a first instruction in response to identifying the interaction, the first instruction indicating a change in behavior for one of the IoT device or the IoT application; and issuing the first instruction to the one of the IoT device or the IoT application, so as to cause the one of the IoT device or the IoT application to change the respective behavior, thereby aligning the rate of the sensor readings published by the IoT device to the service layer hosted on the apparatus with the rate of the sensor readings sampled by the IoT application from the service layer hosted on the apparatus.

17. The method as recited in claim 16, further comprising:

generating a second instruction in response to identifying the interaction, the second instruction indicating a change in behavior for the other one of the IoT device or the IoT application; and issuing the second instruction to the other one of the IoT device or the IoT application, thereby adjusting the interaction between the IoT device and the IoT application.

* * * * *